US012573427B1

(12) United States Patent
Knigge et al.

(10) Patent No.: US 12,573,427 B1
(45) Date of Patent: Mar. 10, 2026

(54) SMEAR HEIGHT DETECTION AND MEASUREMENT IN A DATA STORAGE DEVICE

(71) Applicant: Western Digital Technologies, Inc., San Jose, CA (US)

(72) Inventors: Bernhard E. Knigge, San Jose, CA (US); Yuichi Aoki, Fujisawa (JP); Yukio Kato, Fujisawa (JP); Wangzhen Zhao, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/961,861

(22) Filed: Nov. 27, 2024

(51) Int. Cl.
*G11B 5/31* (2006.01)
*G11B 5/00* (2006.01)
*G11B 21/02* (2006.01)

(52) U.S. Cl.
CPC ................................... *G11B 21/02* (2013.01)

(58) Field of Classification Search
CPC ..... G11B 5/00; G11B 5/09; G11B 2005/0021; G11B 5/012; G11B 5/3133; G11B 5/3188; G11B 5/607; G11B 5/455
USPC .......................................................... 360/59
See application file for complete search history.

(56) References Cited

U.S. PATENT DOCUMENTS 8,773,801 B2 7/2014 Kurita et al.
9,601,140 B1 3/2017 Rajauria 10,482,908 B2 11/2019 Mendonsa et al.
10,950,266 B1 * 3/2021 Rajauria .............. G11B 5/7366
2013/0286805 A1 10/2013 Macken et al.
2014/0268386 A1 9/2014 Li et al.

OTHER PUBLICATIONS

Cheng et al., "Experimental study of smear formation and removal in heat-assisted magnetic recording", Tribology International, 2021, Retrieved from https://www.researchgate.net/publication/354396901_Experimental_study_of_smear_formation_and_removal_in_heat-assisted_magnetic_recording.
Cheng, Qilong, "Thermal Transport, Thermal Protrusion, and Thermally-Induced Material Transfer in the Head-Disk Interface of Heat-Assisted Magnetic Recording", A dissertation submitted in partial satisfaction of the requirements for the degree of Doctor of Philosophy in Engineering—Mechanical Engineering in the Graduate Division of the University of California, Berkeley, Fall 2021, 24 pages, Retrieved from https://www.proquest.com/openview/c20e72dc2776cc3712bc5df3ac109fba/1?pq-origsite=gscholar&cbl=18750&diss=y.

(Continued)

*Primary Examiner* — Nabil Z Hindi
(74) *Attorney, Agent, or Firm* — NOD Law PC

(57) ABSTRACT

A data storage device comprises a disk and a recording head. A thermal fly-height control (TFC) heater thermally adjusts a spacing of the recording head from a surface of the disk. A thermal proximity sensor detects a spacing of the recording head from the disk surface and generates a thermal proximity sensor signal indicative of the detected spacing. A height of smear accumulated on the recording head is determined by dithering the TFC heater about a DC power level, measuring a skewness in the thermal proximity sensor signal while the TFC heater is being dithered, and determining the smear height from the measured skewness.

20 Claims, 16 Drawing Sheets

(56)     References Cited

OTHER PUBLICATIONS

Ma et al, "Study of Head-Disk Interface Characterization Using Touchdown Sensor and Electromagnetic Signal in Hard Disk Drives", IIEEE Transactions on Magnetics, vol. 51, No. 11, Nov. 2015, Retrieved from https://ieeexplore.ieee.org/document/7112145.

Rai et al., "A method for monitoring head media spacing change in a harddisk drive using an embedded contact sensor", Microsystem Technologies, Jun. 16, 2020, vol. 26, pp. 3459-3467, Retrieved from https://link.springer.com/article/10.1007/s00542-020-04911-9.

Zhao et al., "Experimental Study of Dual Heater Slider Touchdown Detectability", Applied Mechanics and Materials, vols. 284-287, 2013, pp. 468-472, Retrieved from https://www.researchgate.net/publication/258743496_Experimental_Study_of_Dual_Heater_Slider_Touchdown_Detectability.

* cited by examiner

430

432

434

442

440

444

SMEAR HEIGHT DETECTION AND MEASUREMENT IN A DATA STORAGE DEVICE

BACKGROUND

Data storage devices such as disk drives comprise a magnetic storage medium such as a disk and a recording head (read/write head) connected to a distal end of an actuator arm that is rotated about a pivot by an actuator such as a voice coil motor (VCM) to position the recording head radially at a carefully controlled fly height over the disk. The disk comprises a plurality of radially spaced, concentric tracks for recording user data sectors and servo sectors. The servo sectors comprise head positioning information (e.g., a track address) that is read by the recording head and processed by a servo control system to control the actuator arm as it seeks from track to track. A disk drive typically comprises a plurality of disks each having a top and bottom surface accessed by a respective recording head. The actuator typically rotates a number of actuator arms about a pivot in order to simultaneously position a number of recording heads over respective disk surfaces based on servo data recorded on each disk surface.

FIG. 1 is a conceptual diagram of a conventional disk format 2 comprising a number of servo tracks 4 defined by servo sectors $6_0 \ldots 6_N$ recorded around the circumference of each servo track 4. Each servo sector $6_i$ comprises a preamble 8 for storing a periodic pattern that allows proper gain adjustment and timing synchronization of the read signal, and a sync mark 10 for storing a special pattern used to symbol synchronize to a servo data field 12. Servo data field 12 stores coarse head positioning information, such as a servo track address, used to position the head over a target data track during a seek operation. Each servo sector $6_i$ further comprises groups of servo bursts 14 (e.g., N and Q servo bursts) that are recorded with a predetermined phase relative to one another and relative to the servo track centerlines. The phase-based servo bursts 14 provide fine head positioning information used for centerline tracking while accessing a data track during read and write operations. A position error signal (PES) generated by reading servo bursts 14 represents a measured position of the recording head relative to a centerline of a target servo track. A servo controller processes the PES to generate a control signal applied to the actuator to actuate the recording head radially over the disk in a direction that reduces the PES.

In order to achieve higher areal densities, recording heads are sometimes configured for heat-assisted magnetic recording (HAMR). HAMR facilitates higher data densities by temporarily heating the recording medium during the write process. A laser integrated into the write head heats a tiny spot on the disk surface to lower its magnetic coercivity, making it easier for the write head to change the magnetic orientation of that specific area. Once the medium cools down, it retains the written data in a stable and permanent state. The HAMR heating process allows the use of media with much smaller and more thermally stable magnetic grains, which in turns allows for higher data storage densities compared to traditional recording methods. However, the HAMR heating process may also soften and disrupt the lubricant layer on the disk and may burn microscopic contaminants, dust, particles, and carbon-based residue on the disk, leading to a contaminant and debris build-up known as smear. Over time, the presence of smear build up at the head-disk interface (HDI) can affect head-disk spacing and can impact the reliability of data reads and writes. In addition, the smear build-up may bridge the gap between the head and the disk and lead to back heating, or heat transfer from the hot spot on the disk to the recording head. Thus, detection and management of smear is of substantial importance in a disk drive incorporating heat-assisted magnetic recording.

The description provided in this background section should not be assumed to be prior art merely because it is mentioned in or associated with this background section. The background section may include information that describes one or more aspects of the subject technology.

SUMMARY

The following summary relates to one or more aspects or embodiments disclosed herein. It is not an extensive overview relating to all contemplated aspects or embodiments, and should not be regarded as identifying key or critical elements of all contemplated aspects or embodiments, or as delineating the scope associated with any particular aspect or embodiment. The following summary has the sole purpose of presenting certain concepts relating to one or more aspects or embodiments disclosed herein in a simplified form to precede the detailed description that follows.

Some aspects of this disclosure are directed to a data storage device comprising a disk; a recording head; a thermal fly-height control (TFC) heater configured to thermally adjust a spacing of the recording head from a surface of the disk; a thermal proximity sensor configured to detect a spacing of the recording head from the disk surface and to generate a thermal proximity sensor signal indicative of the detected spacing; and one or more processing devices configured to dither the TFC heater about a DC power level, measure a skewness in the thermal proximity sensor signal while the TFC heater is being dithered; and determine a height of smear accumulated on the recording head from the measured skewness.

In some implementations, the height of the smear is determined by measuring an amount of TFC heater power required to displace the recording head from a point where the skewness begins in the thermal proximity sensor signal to a point where the skewness is at a maximum in the thermal proximity sensor signal.

In some implementations, the thermal proximity sensor comprises a near-field temperature sensor (NTS) configured in a writer portion of the recording head, and the TFC heater is configured in the writer portion of the recording head.

In some implementations, a presence of the smear is confirmed by determining that a median or an RMS of the thermal proximity sensor signal has a maximum at the TFC heater power where the skewness is at the maximum.

In some implementations, a presence of the smear is confirmed by detecting bending in a discrete Fourier transform (DFT) of a signal generated by an embedded contact sensor (ECS) as the TFC heater power is increased to move the recording head towards touchdown.

In some implementations, a presence of the smear is confirmed by detecting a minima in a discrete Fourier transform (DFT) of a signal generated by the NTS as the TFC heater power is increased to move the recording head towards touchdown.

In some implementations, a presence of the smear is confirmed by detecting off-track or down-track vibration before touchdown of the recording head.

In some implementations, a presence of the smear is confirmed by detecting a second harmonic in the NTS signal.

In some implementations, the smear is removed from the recording head by performing at least one touchdown overpush.

Other aspects of this disclosure are directed to a method for detecting smear height on a recording head of a data storage device. The method comprises dithering a thermal fly-height control (TFC) heater that is configured to thermally adjust a spacing of the recording head from a surface of a disk of the data storage device about a DC power level; measuring a skewness in a thermal proximity sensor signal indicative of the spacing of the recording head from the disk surface while the TFC heater is being dithered; and determining a height of smear accumulated on the recording head from the measured skewness.

Further aspects of this disclosure are directed to a data storage device comprising a disk; a recording head; a thermal fly-height control (TFC) heater configured to thermally adjust a spacing of the recording head from a surface of the disk; a thermal proximity sensor configured to detect a spacing of the recording head from the disk surface and to generate a thermal proximity sensor signal indicative of the detected spacing; and one or more processing devices configured to gradually increase a power of the TFC heater, monitor the thermal proximity sensor signal as the TFC heater power is increased, and detect a cooling signature in the thermal proximity sensor signal that is indicative of accumulation of smear on the recording head.

Various additional aspects of this disclosure are described below and depicted in the accompanying figures and will be further apparent based thereon.

BRIEF DESCRIPTION OF THE DRAWINGS

Various features and advantages of this disclosure will be apparent from the following description and accompanying drawings. The drawings are not necessarily to scale; emphasis instead is placed on illustrating the principles of this disclosure. In the drawings, like reference characters may refer to the same parts throughout the different views. The drawings depict only illustrative examples of this disclosure and are not limiting in scope.

DETAILED DESCRIPTION

The words "exemplary" and "example" as used herein mean "serving as an example, instance, or illustration." Any embodiment described herein as "exemplary" or as an "example" should not be construed as preferred or advantageous over other embodiments.

The embodiments described herein do not limit the invention to the precise form disclosed, nor are they exhaustive. Rather, various embodiments are presented to provide a description for utilization by others skilled in the art. Technology continues to develop, and elements of the disclosed embodiments may be replaced by improved and enhanced items. This disclosure inherently discloses elements incorporating technology available at the time of this disclosure.

Figure 1:
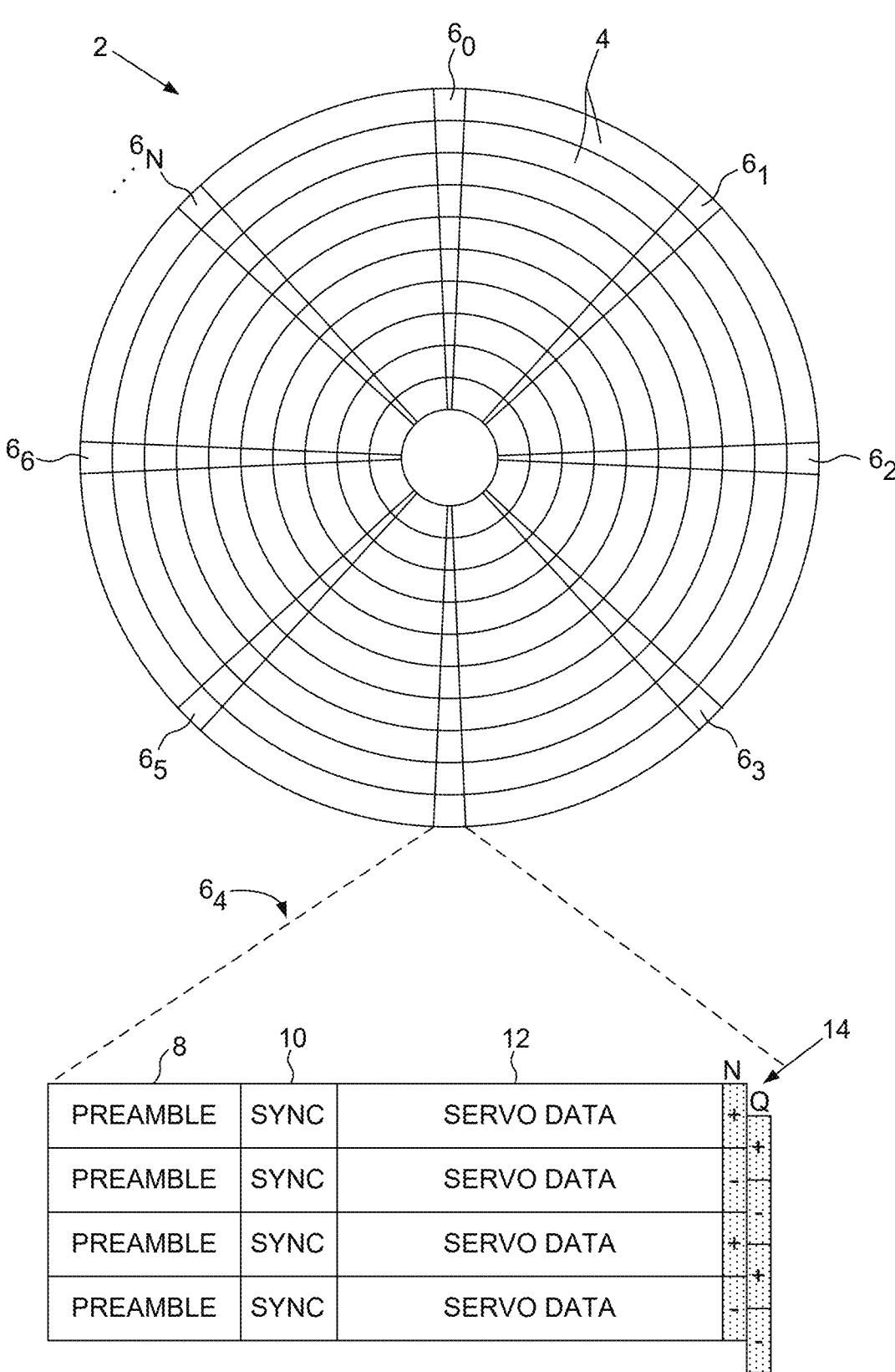
FIG. 1 is a conceptual diagram of a conventional disk format, in accordance with aspects of this disclosure.
Figures 2A, 2B, 2C:
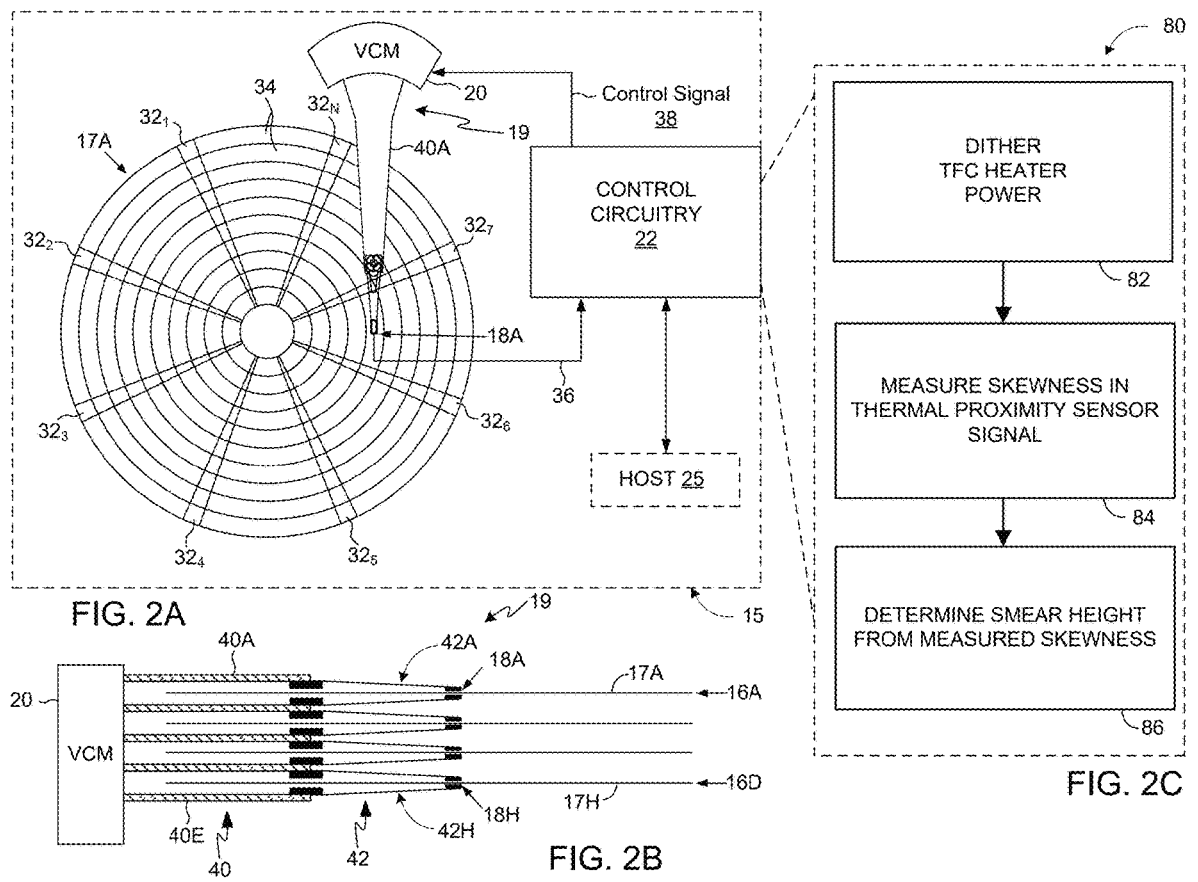
FIG. 2A is a conceptual diagram of a top view of a data storage device in the form of a hard disk drive (HDD), in accordance with aspects of this disclosure.
FIG. 2B is a conceptual diagram of a side view of a data storage device in the form of an HDD, in accordance with aspects of this disclosure.
FIG. 2C is a flow diagram illustrating a method for determining the height of smear buildup that has accumulated on a recording head of the data storage device, in accordance with aspects of this disclosure.

FIGS. 2A and 2B are conceptual top and side views of a data storage device in the form of hard disk drive (HDD) 15, in accordance with aspects of this disclosure. HDD 15 comprises recording heads 18 (e.g., recording heads 18A . . . 18H) that are actuated over surfaces 17 (e.g., surfaces 17A . . . 17H) of magnetic storage media 16 (e.g., disks 16A . . . 16D) by actuator assembly 19. FIG. 2C is a flow diagram of a method 80 that control circuitry 22 of HDD 15, which may be configured in one or more processing devices, performs or executes in controlling the operations of HDD 15, including the operations of recording heads 18 (e.g., heads 18A . . . 18H) disposed on actuator assembly 19. In particular, method 80 is a method for determining the height of smear buildup that has accumulated on a recording head 18. In step 82, the power to a thermal fly-height control (TFC) heater is oscillated or dithered about a DC power level. In step 84, while dithering the TFC heater, the skewness of a signal from a thermal proximity sensor such as near field temperature sensor (NTS) 142 and/or embedded contact sensor (ECS) 114 is measured. In step 86, the height of smear accumulated on recording head 18 is determined from the measured skewness of the thermal proximity sensor signal.

Actuator assembly 19 is configured to position heads 18 over surfaces 17 (e.g., surfaces 17A . . . 17H) of disks 16. Heads 18 comprise write and read elements configured for writing and reading control features and data to and from disk surfaces 17. Actuator assembly 19 comprises primary actuator 20, which is typically a voice coil motor (VCM), and a number of actuator arms 40 (e.g., actuator arms 40A . . . 40E). Each head 18 is configured at a distal end of an actuator arm 40 via a suspension 42 (suspensions 42A . . . 42H). Each actuator arm 40 is configured to suspend a head 18 in close proximity over a corresponding disk surface 17. For example, head 18A is suspended by topmost actuator arm 40A via suspension 42a over topmost disk surface 17A, and head 18H is suspended by lowest actuator arm 40H via suspension 42H over lowest disk surface 17H. FIGS. 2A-B are presented for exemplary purposes only; a wide variety of other numbers of disks, disk surfaces, primary actuators, actuator assemblies, suspensions, and heads are contemplated and may be used.

FIG. 2A also depicts servo sectors 32 (e.g., servo sectors $32_1 \ldots 32_N$) written onto disk surfaces 17 (e.g., disk surface 17A) to define a plurality of evenly-spaced, concentric tracks 34. Each servo sector 32 may include a phase lock loop (PLL) field, a servo sync mark (SSM) field, a track identification (TKID) field, a sector ID, and a group of servo bursts (an alternating pattern of magnetic transitions) that the servo system of HDD 15 samples to align a head 18 with and relative to a particular track 34. Servo sectors 32 are spaced sequentially around the circumferences of tracks 34 and extend radially outward from the inner diameter of disk surfaces 17. Data is conventionally written in data regions in a plurality of discrete data sectors. Each data region is typically preceded by a servo sector 32.

Control circuitry 22 processes read signals 36 emanating from heads 18 (e.g., head 18A) to demodulate servo data written on the disk (e.g., servo sectors 32) to generate a position error signal (PES) representing an error between the actual position of the head and a target position relative to a target track. Control circuitry 22 processes the PES using a suitable servo control system to generate VCM control signal 38 that is applied to VCM 20, which rotates actuator arm 40 about a pivot to actuate head 18 radially over disk surface 17 in a direction that reduces the PES. In some examples, HDD 15 may also comprise a suitable micro actuator, such as a piezoelectric (PZT) element, for actuating head 18 relative to a suspension 42, or for actuating a suspension 42 relative to actuator arm 40. Host 25 may be a computing device such as a desktop computer, laptop, server, mobile computing device (e.g., smartphone, tablet, etc.), or any other suitable computing device. Alternatively, host 25 may be a test computer that performs calibration and testing functions as part of the HDD manufacturing process.

Each head 18 is conventionally embedded in the trailing edge of a component known as a slider. The slider in turn is affixed to a suspension, which is found at the terminating end of actuator arm 40. As disk 16 spins at a high speed, the slider is lifted, or 'flies', above disk 16. It hovers on a thin layer of air, maintaining a stable distance measured in nanometers from disk surface 17. This minuscule distance permits heads 18 to retrieve or store data while avoiding direct physical contact with disk surface 17, thereby preventing data corruption and potential damage to disk surface 17.

Figure 3:
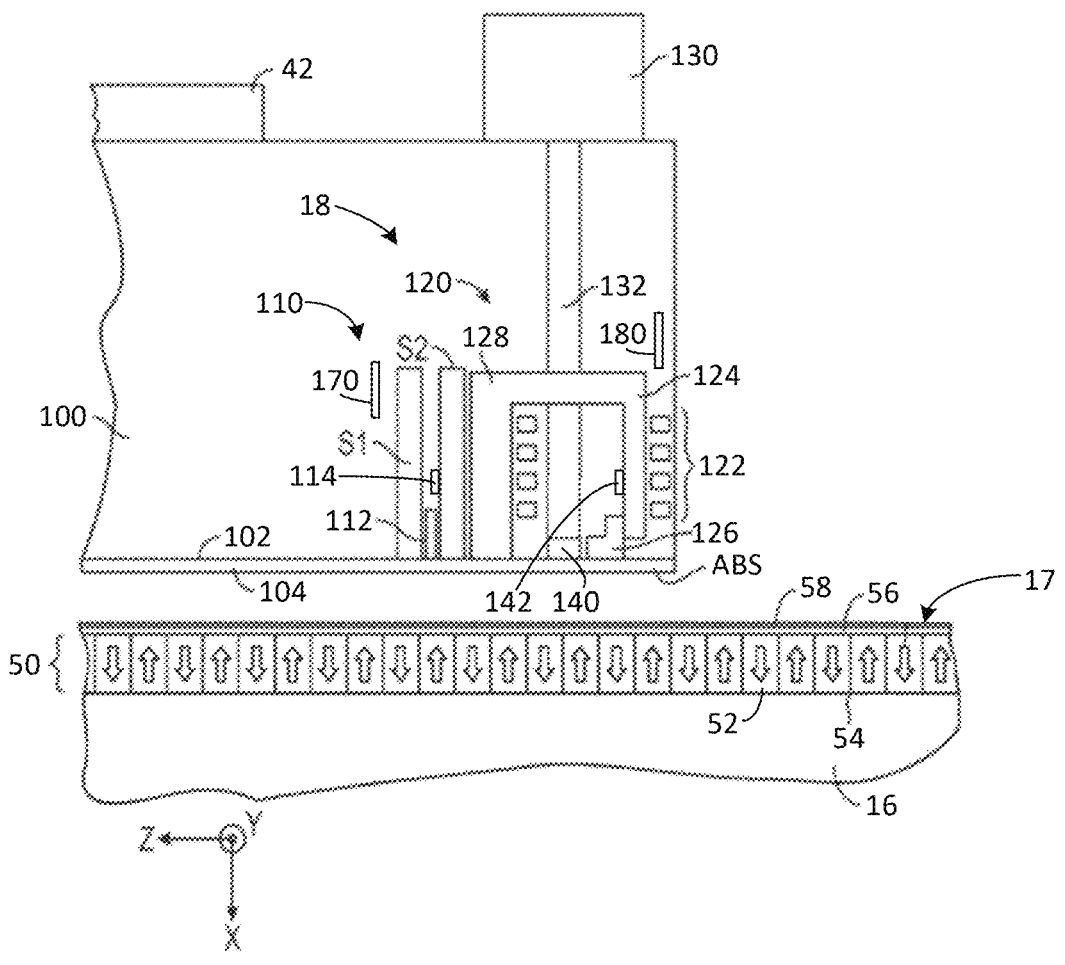
FIG. 3 is a conceptual sectional diagram of a slider supported by a suspension and hovering over a disk surface, in accordance with aspects of this disclosure.

FIG. 3 is a conceptual sectional diagram of a slider 100 supported by a suspension 42 and hovering over surface 17 of disk 16, according to aspects of this disclosure. The components of head 18 are integrated into the trailing edge of slider 100. As disk 16 rotates, movement of actuator arm 40 allows head 18 to access different data tracks on disk 16. In some implementations, slider 100 is configured for HAMR. It should be understood that slider 100 of FIG. 3, including its illustrated read and write components, is presented for exemplary purposes only and is merely one example of how a slider might be configured. Slider 100 could be configured in many other ways and still implement the principles of this disclosure. Moreover, while only one disk surface 17 with an associated slider 100 and head 18 is shown in FIG. 3, there are typically multiple disks 16 stacked on a hub and rotated by a spindle motor (as shown in FIG. 2B, for example), with a separate slider and head associated with each disk surface.

In FIG. 3, the X direction denotes a direction perpendicular to the air bearing surface (ABS) of the slider, the Y direction denotes a track width or cross-track direction, and the Z direction denotes an along-track or on-track direction. Disk 16 is a conventional disk with recording layer 50 being a continuous non-patterned magnetic recording layer with magnetized regions or bits 52. Bits 52 are physically adjacent to each other with magnetic transitions 54 therebetween. Recording layer 50 may be formed, for example, of a high-anisotropy ($K_u$) substantially chemically-ordered FePt (or CoPt) alloy with perpendicular magnetic anisotropy. Disk surface 17 may include overcoat 56, typically formed of amorphous diamond-like carbon (DLC) and liquid lubricant layer 58, typically a bonded perfluoropolyether (PFPE).

Overcoat 104, which is deposited onto recording layer-facing surface 102 of slider 100, is typically a DLC overcoat whose outer surface forms the ABS of slider 100. Head 18 is integrated on the trailing edge of slider 100 and comprises read portion 110 and write portion 120. Read portion 110 comprises magneto resistive (MR) head or pole 112 positioned between shields S1 and S2 that senses the magnetic orientation of bits 52 in recording layer 50, which corresponds to stored data. In particular, the magnetic field from each bit 52 influences the resistance of read head 112. This change in resistance of read head 112 is measured by control circuitry 22 and interpreted as a '0' or '1', thereby reading the stored data. Shields S1 and S2 confine the sensed magnetic field to the bit being read and prevent interference from neighboring bits.

At least one thermal proximity sensor is configured to detect the spacing of recording head 18 from disk surface 17 and to generate a spacing sensor signal that is indicative of the detected spacing. In some implementations, a reader thermal proximity sensor 114 is configured near read portion 110 to precisely measure the spacing between read portion 110 and disk surface 17, and a writer thermal proximity sensor 142 is configured near write portion 120 to measure the spacing between write portion 120 and disk surface 17.

In one non-limiting example, reader thermal proximity sensor 114 is an embedded contact sensor (ECS). ECS 114 operates based on the principle of thermal proximity sensing. It may include, for example, a small resistive element whose electrical resistance changes with temperature. ECS 114 is sensitive to thermal dissipation that occurs due to air and/or near-contact friction between read head 112 and disk surface 17 when they come close to each other. As read head 112 gets closer to disk surface 17, the amount of heat transferred to ECS 114 from disk surface 17 gradually decreases (i.e., disk proximity cooling right before touchdown), causing the temperature of ECS 114 to drop slightly. If one further increases the TFC power, contact induced friction will lead to an increase in temperature of ECS 114. This change in temperature results in a change in the resistance of ECS 114, which can be measured and used to estimate the spacing between read head 112 and disk surface 17. The exact placement and configuration of reader thermal proximity sensor 114 within read portion 110 may vary; the placement and configuration shown in FIG. 3 is merely one non-limiting example. In addition, while an ECS is one example of a thermal proximity sensor, other types of thermal proximity sensors may be used.

Write portion 120 generates a recording magnetic field and comprises coil 122, main magnetic pole 124 for transmitting flux generated by coil 122, write pole 126, and return pole 128. Coil 122 generates a magnetic field when an electrical current containing data as a current pattern is sent to it. The strength and direction of the magnetic field generated by coil 122 depends on the current passing through it. Main magnetic pole 124 concentrates and directs the magnetic field generated by coil 122 and write pole 126 directs the magnetic field onto a very small area of the disk that corresponds to the bit 52 being written. The field from write pole 126 sets the magnetic orientation of bit 52, effectively writing a '1' or a '0' depending on the direction of the field. Return pole 128 provides a path for the magnetic flux to return from write pole 126 to coil 122.

Semiconductor laser 130 is a heat assisted magnetic recording (HAMR) light source and may be configured on top of slider 100 as shown in FIG. 3 or may be located elsewhere (such as on suspension 42) and coupled to slider 100 by an optical channel. Laser 130 typically emits light having a wavelength of 780-980 nm. Optical waveguide 132 guides light from laser 130 to near-field transducer (NFT) 140. NFT 140 typically comprises a low loss metal (e.g., gold, silver, aluminum, or copper) shaped to concentrate surface charge motion at a tip located at the slider ABS when light from waveguide 132 is incident. NFT 140 concentrates the light from laser 130 into a tiny spot to momentarily heat a single bit 52 in recording layer 50. This localized heating reduces the coercivity of the magnetic material in that spot, allowing the magnetic orientation of bit 52 to be changed more easily, and in general allowing the HAMR head to write data at much higher densities than in conventional magnetic recording.

To effectively heat recording layer 50, NFT 140 must be very close to disk surface 17, typically on the order of a few nanometers. Writer thermal proximity sensor 142 may be configured near NFT 140 to measure and control spacing of NFT 140 and write portion 120 from disk surface 17 based on changes in temperature of NFT 140. In one non-limiting example, writer thermal proximity sensor 142 is a near-field temperature sensor (NTS). NTS 142 operates in a similar fashion to ECS 114. As NFT 140 gets closer to disk surface 17, the amount of heat transferred to NFT 140 from disk surface 17 increases, causing its temperature to rise. This change in temperature causes the temperature of NTS 142 to rise, resulting in a change in electrical resistance that can be measured to estimate head-disk spacing. The exact placement and configuration of writer thermal proximity sensor 142 within write portion 120 may vary; the placement and configuration shown in FIG. 3 is merely one non-limiting example. In addition, while an NTS is one example of a thermal proximity sensor, other types of thermal proximity sensors may be used.

As areal density increases, the recording head generally needs to fly closer and closer to the disk surface. Thermal fly-height control (TFC) systems may be used to fly the recording head as close as possible to the disk surface. For example, at least one heater or heater element may be positioned in the recording head and may be controlled, for example, by a preamplifier associated with the recording head. When current is applied to the heater, the surrounding head and slider material expand in response to the heat, which causes a bulge in the slider towards the disk surface, reducing the fly height of the recording head. During read operations, the heater may cause the reader to be closer to the disk to increase the strength of the read-back signal, and during write operations, the heater may cause the writer to be closer to the disk to increase the robustness of the magnetization written to the disk. TFC may also be used to compensate for fly height fluctuations such as temperature, pole tip recession, and the like. In setting a preferred slider fly height, electrical current may be applied to the TFC heater, which causes the surrounding slider materials to expand and protrude outward closer to the disk, until contact with the disk surface is made ("touchdown" or "TD"), at which point the current to the heater is slightly reduced to cause the surrounding slider materials to contract away from the disk ("touchdown backoff" or "TDBO"). In some examples, the TDBO fly height may be used as the preferred fly height during HDD operation. Thermal proximity sensors such as ECS 114 and NTS 142 sense touchdown in addition to the spacing of head 18 from disk surface 17. The slider temperature suddenly increases due to frictional heating upon touchdown, which causes the temperatures and resistances of ECS 114 and NTS 142 to suddenly rise and is indicative of a touchdown.

In some examples, dual TFC heaters may be incorporated into recording head 18 to effect targeted thermal expansion (bulging) of read portion 110 and write portion 120, such that spacing between the read and write portions of head 18 and disk surface 17 can be more carefully controlled. Referring again to FIG. 3, a read heater 170 (TFC1) may be positioned near read portion 110 and a write heater 180 (TFC2) may be positioned near write portion 120. In one non-limiting example, heaters 170 and 180 comprise heater resistors to which electrical signals are applied to cause a desired thermal expansion of read portion 110 and/or write portion 120. Heaters 170 and 180 may take any suitable form and be in any location appropriate to cause thermal expansion of read portion 110 and/or write portion 120 when engaged. There are several modes or techniques for using or powering dual heaters 170 and 180. In dual independent heater (DIH) mode, read heater 170 (TFC1) is used only during read operations, and write heater 180 (TFC2) is used only during write operations. In other modes, power may be applied to both heaters simultaneously according to a dual heater ratio (DHR) or power ratio (PR), where DHR (PR) =TFC1/(TFC1+TFC2). TFC1 is the power applied by read heater 170, and TFC2 is the power applied by write heater 180. Thus, the DHR is defined in terms of the read heater; i.e., a DHR of 30% means that the read heater is receiving 30% of the power applied to both heaters. While defined in terms of the read heater, a DHR of 30% also conveys of course that the write heater is receiving 70% of the power applied to both heaters.

Figure 4A:
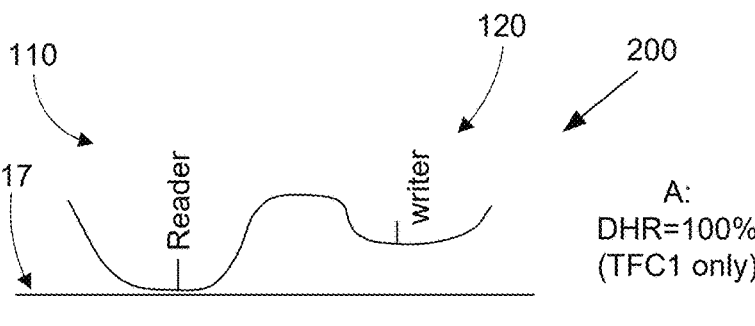
FIGS. 4A-4D are conceptual diagrams illustrating the effect of the dual heater ratio (DHR) on the spacing of the read and write portions of the recording head from the disk surface, in accordance with aspects of this disclosure.
Figure 4B:
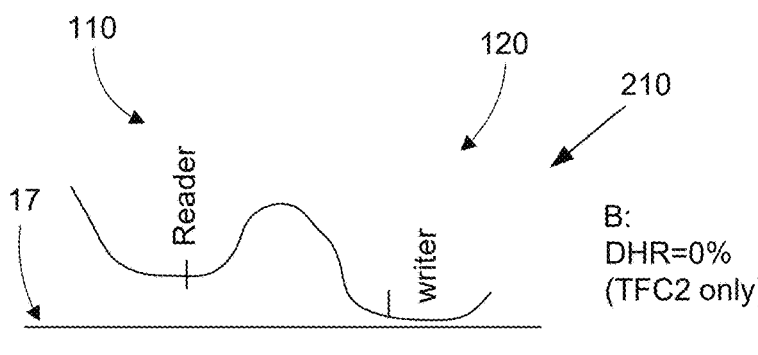
Figure 4C:
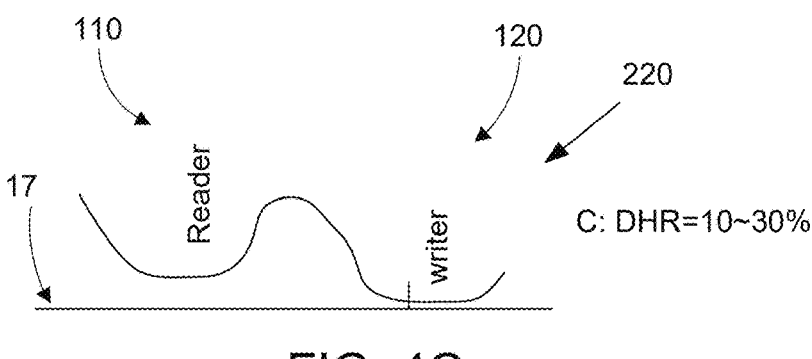
Figure 4D:
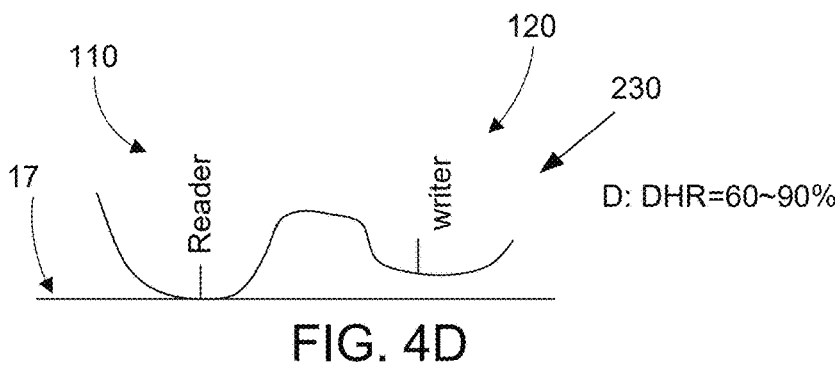

By setting the DHR, read heater 170 (TFC1) and write heater 180 (TFC2) are controlled to adjust thermal expansion of read portion 110 and write portion 120 towards and away from disk surface 17. FIGS. 4A-4D are conceptual diagrams illustrating the effect of the DHR on the spacing of read portion 110 and write portion 120 from disk surface 17. In diagram 200 of FIG. 4A, DHR=100%, meaning that all power is supplied to read heater 170 (TFC1) and no power is supplied to write heater 180 (TFC2). With DHR=100%, read portion 110 is very close to disk surface 17 and write portion 120 is substantially spaced from disk surface 17. In diagram 210 of FIG. 4B, DHR=0%, meaning that no power is supplied to read heater 170 and all power is supplied to write heater 180 (TFC2). With DHR=0%, read portion 110 is substantially spaced from disk surface 17 and write portion 120 is very close to disk surface 17. In diagram 220 of FIG. 4C, DHR=10~30%, meaning that more heater power is being supplied to write heater 180 relative to read heater 170. With DHR=10~30%, write portion 120 is close to disk surface 17 and read portion 110 is more spaced from disk surface 17, though not as spaced as when DHR=0% (FIG. 4B). In diagram 230 of FIG. 4D, DHR=60~90%, meaning that more heater power is being supplied to read heater 170 relative to write heater 180. With DHR=60~90%, read portion 110 is very close to disk surface 17 and write portion 120 is more spaced from disk surface 17, though not as spaced as when DHR=100% (FIG. 4A).

Figure 5:
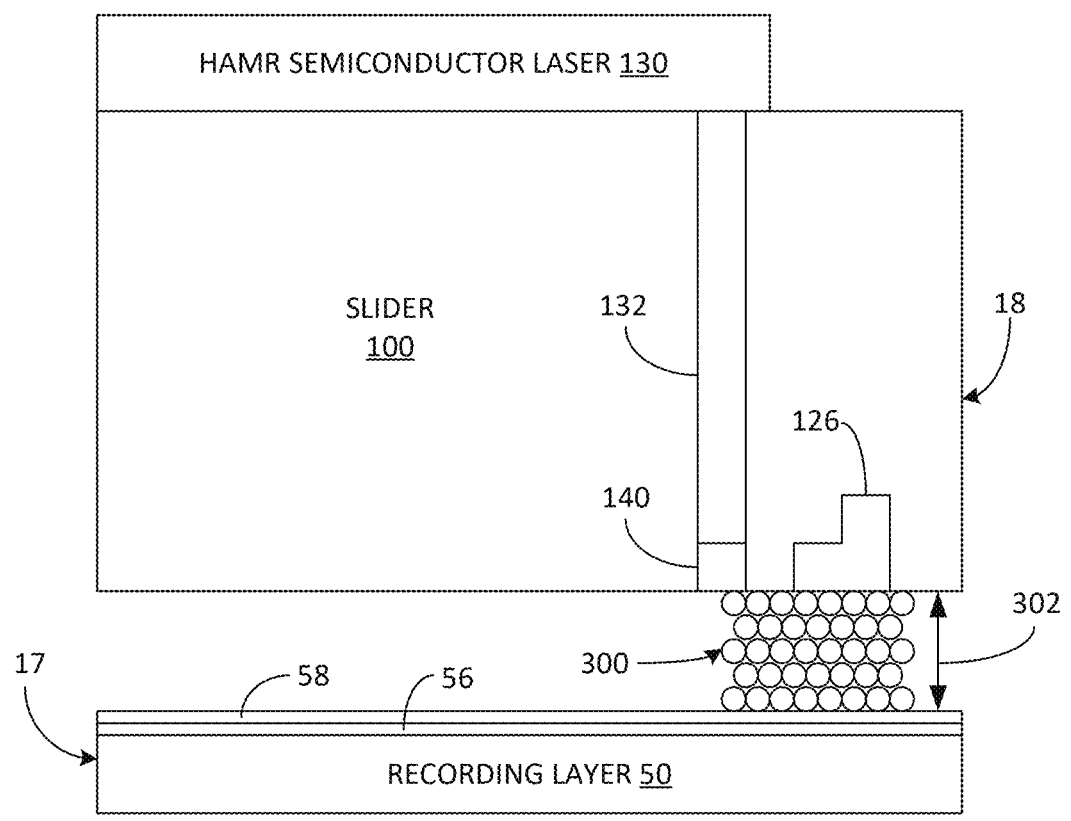
FIG. 5 is a conceptual diagram illustrating an accumulation of smear between a recording head and a disk surface, in accordance with aspects of this disclosure.

As conceptually illustrated in FIG. 5, during heat-assisted magnetic recording (HAMR) write operations, heating of disk surface 17 by laser 130 may cause significant desorption of lubricant from lubricant layer 58, carbon from overcoat (DLC) layer 56, dust particles, and other contaminants from disk surface 17. These materials may buildup over time to form an accumulation 300 known as smear on recording head 18 that may affect (increase) head-disk spacing. This increased spacing may lead to earlier touchdown detection, negatively impact recording performance, and reduce the lifespan of head 18. As shown in FIG. 5, smear accumulation 300 may eventually fill the gap between head 18 and disk surface 17 (currently on the order of about 0.5-2 nm) and lead to transfer of heat from the heated disk surface 17 to recording head 18 (back heating), which can further degrade the performance of recording head 18. Smear issues are not limited to HAMR. In perpendicular magnetic recording (PMR) interfaces, for example, the accumulation of smear also causes changes in head-disk spacing and may lead to reliability problems.

In-situ or real time smear detection and height measurement is needed to manage smear accumulation 300 before it leads to critical performance issues. In particular, a measurement of the height 302 of smear accumulation 300 is needed so that appropriate corrective action can be taken to remove smear accumulation 300. As mentioned above, smear accumulation 300 may eventually fill the entire gap or spacing between head 18 and disk surface 17, such that the height 302 of smear accumulation 300 can be inferred by measuring the fly height (FH) or spacing. Lube/carbon smears typically lead to a cooling signature and hence increased skewness in signals from thermal proximity sensors such as ECS 114 and NTS 142. By oscillating or dithering a TFC heater and monitoring the skewness in the thermal proximity sensor signals, thermal impedance changes caused by the lube/carbon smear can be detected. With reference again to method 80 of FIG. 2C, by dithering or oscillating a TFC heater about a DC power level in step 82, and measuring any skewness in the signal from thermal proximity sensors such as ECS 114 and NTS 142 in step 84, the height 302 of smear accumulation 300 can be determined from the measured skewness of the thermal proximity sensor signal in step 86.

Figure 6A:
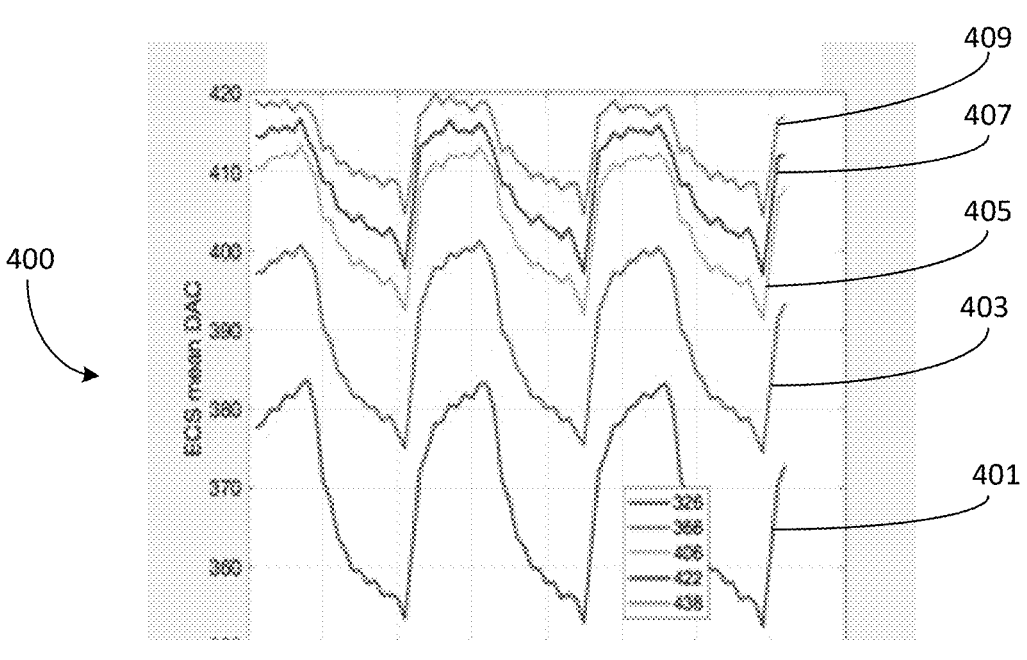
FIG. 6A is a graph showing how an embedded contact sensor (ECS) signal behaves while a TFC heater is dithered at different DC power levels during touchdown backoff (TDBO), in accordance with aspects of this disclosure.
Figure 6B:
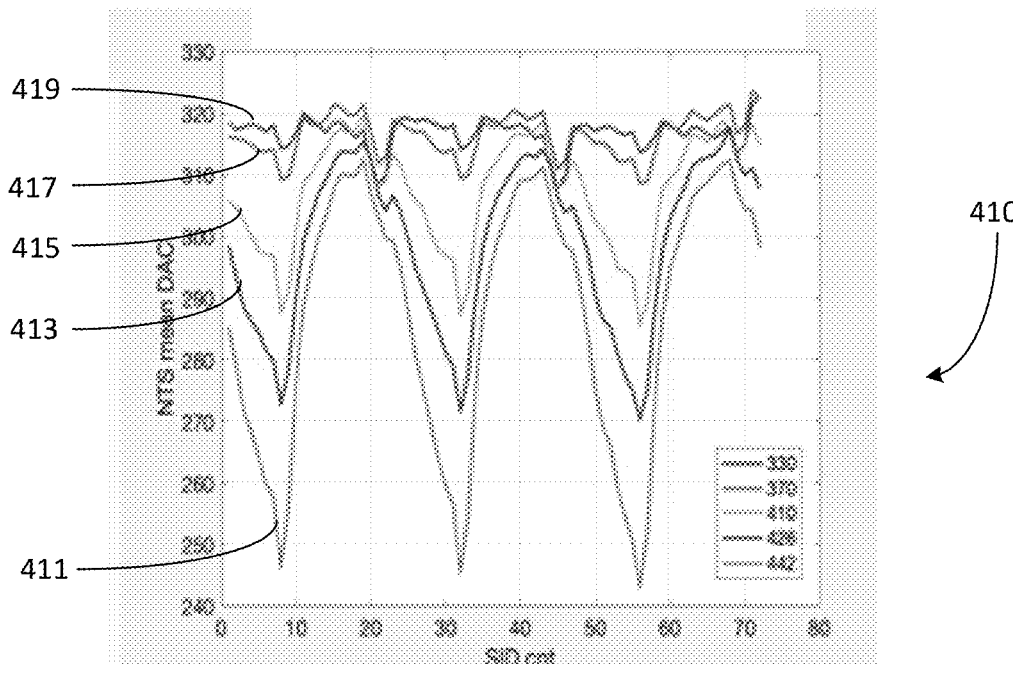
FIG. 6B is a graph showing how a near-field temperature sensor (NTS) signal behaves while a TFC heater is dithered at different DC power levels during TDBO, in accordance with aspects of this disclosure.
Figure 6C:
FIG. 6C is a graph plotting the skewness of the NTS signal versus TFC heater power, in accordance with aspects of this disclosure.
Figure 6C:
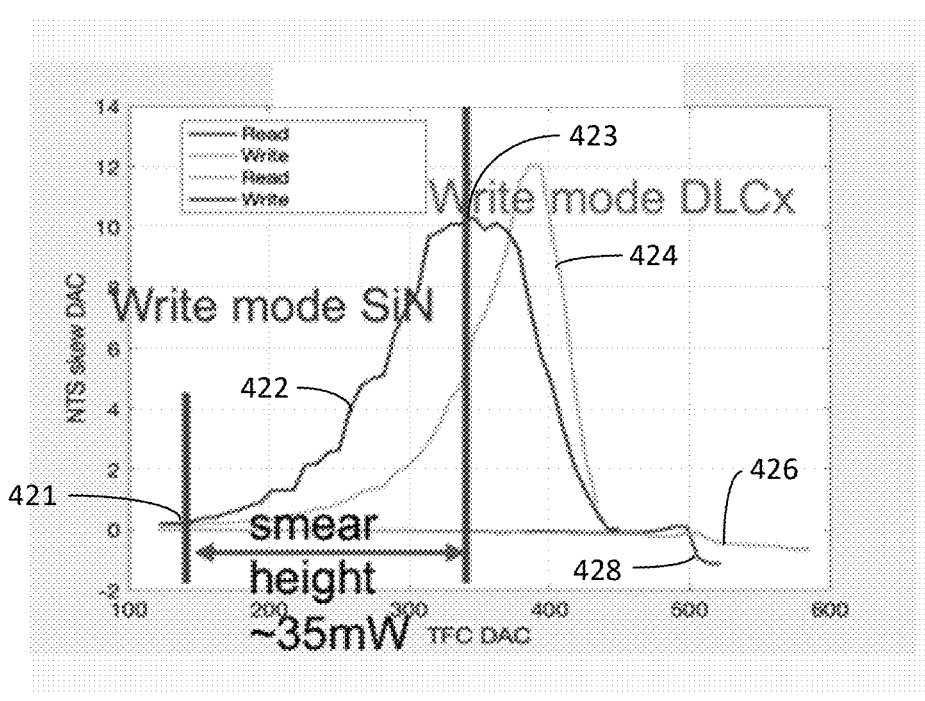

The process of monitoring for and measuring skewness in the thermal proximity sensor signals while dithering the TFC heater is illustrated in FIGS. 6A-6C. FIG. 6A is a graph 400 showing how the signal from thermal proximity sensor (ECS) 114 behaves while the TFC heater is dithered at different DC power levels during touchdown backoff (TDBO). The Y-axis represents the ECS signal level, which corresponds to the temperature near the reader. The ECS signal is indicated on the Y-axis in mean DAC (digital-to-analog converter) units, with higher ECS mean DAC units indicating that the reader is closer to disk surface 17. The X-axis represents dither cycles of TFC heater power modulation (indicated by SID units) that alternately thermally expand head 18 to move towards disk surface 17 and thermally contract head 18 to move away from disk surface 17. ECS curves 401, 403, 405, 407, 409 show the ECS signal as write heater 180 (TFC2) is dithered about different DC power levels, with ECS curve 401 illustrating dithering about the lowest DC power level of graph 400 and ECS curve 409 illustrating dithering about the highest DC power level of graph 400. As DC power is increased, the head thermally expands and moves closer to the disk. As can be seen in FIG. 6A, the ECS signals do not exhibit significant asymmetry at any of the TFC2 power levels. The ECS waveforms remain largely symmetrical, even as the head moves closer to the disk with increased TFC heater power. No significant smear cooling effect is observed, as evidenced by the lack of asymmetry in the ECS curves. This symmetry suggests minimal interference from smear or contamination at the reader.

FIG. 6B is a graph 410 showing how the signal from thermal proximity sensor (NTS) 142 behaves while the TFC heater is dithered at different DC power levels during TDBO. As can be seen in FIG. 6B, the NTS signal exhibits significant asymmetry due to the cooling effects caused by smear buildup near the writer. This asymmetry correlates with smear presence and facilitates obtaining a height measurement of the smear accumulation. NTS curves 411, 413, 415, 417, 419 show the NTS signal as writer heater 180 (TFC2) is dithered about different DC power levels, with NTS curve 411 illustrating dithering about the lowest DC power level of graph 410 and NTS curve 419 illustrating dithering about the highest DC power level of graph 410. As DC power is increased, the head thermally expands and moves closer to the disk. In contrast to the ECS signals of FIG. 6A, the NTS signals of FIG. 6B exhibit significant asymmetry, particularly in curves 411, 413, and 415. The downward dips in these curves represent rapid cooling events caused by interaction with smear accumulation 300. The downward dips are followed by steep upward rises as head 18 moves away from disk surface 17 during dithering and emerges from the smear. The steep, uneven nature of these dips and rises reflect cooling effects caused by contact with smear or lubricant, which leads to uneven thermal behavior in head 18. The cooling signature of the smear is a reliable indicator of the extent of smear buildup.

By analyzing the skewness of the NTS signal, which is a function of the asymmetry of the NTS signal, the height of the smear accumulation can be determined. Skewness is a time domain metric that measures asymmetry of a waveform. FIG. 6C is a graph 420 illustrating the skewness of the NTS signal as a function of TFC heater power (in this case, TFC2) during both read and write modes. As will be explained below, the TFC power required to displace head 18 from a point where skewness in the NTS signal begins to a point of maximum skewness is directly indicative of the height of the accumulated smear on recording head 18.

In FIG. 6C, the Y-axis represents the skewness of the NTS signal in DAC units, with a higher skew value indicating higher skewness in the NTS signal. The skewness of a signal is a statistical measure of the asymmetry of its distribution. In particular, skewness is calculated from asymmetry by measuring how much the signal distribution deviates from its mean, with larger deviations indicating greater skewness. The skewness s of a distribution is defined as $s=E(x-\mu)^3\sigma^3$, where $\mu$ is the mean of x, $\sigma$ is the standard deviation of x, and E(t) represents the expected value of the quantity t. Symmetric distributions where values are evenly spread on both sides of the mean, such as those shown by the ECS signals of FIG. 6A, have little or no skewness (a skewness value close to zero). Signals with asymmetric distributions, by contrast, such as the NTS curves of FIG. 6B with steep temperature drops due to the cooling effect of the smear, have higher skewness values. The X-axis in graph 420 represents TFC power (in this case, TFC2), which controls the amount of thermal expansion in head 18, in DAC units. As TFC power increases, the head thermally expands and moves closer to the disk.

In FIG. 6C, curve 422 represents skewness of the NTS signal during write mode for a head coated with a first material; curve 424 represents skewness of the NTS signal during write mode for a head coated with a second material; curve 426 represents skewness of the NTS signal during read mode for a head coated with a first material; and curve 428 represents skewness of the NTS signal during read mode for a head coated with a second material. In write mode, there is a significant increase in skewness in the first material coated head NTS signal (curve 422) as TFC power (TFC2) is increased, approaching a maximum skewness at around 350 DAC. This reflects the increased asymmetry in the NTS signal as the head encounters smear, leading to rapid cooling near the writer. The second material coated head NTS signal (curve 424) also shows a sharp increase in skewness as TFC2 power is increased, with a maximum skewness around 390 DAC. Read mode curves 426, 428, by contrast, show little to no skewness, indicating that smear buildup primarily affects the writer side of the head.

Smear height can be determined from the skewness and TFC power measurements of FIG. 6C. In particular, the total increase of TFC power from the point where skewness begins (indicating where the head initially encounters smear contamination) to the point where skewness reaches its maximum (indicating where the smear cooling effect is most significant) is measured. With respect to NTS skewness curve 422 of FIG. 6C, for example, TFC power increases from point 421 (where the NTS signal begins to exhibit skewness) to point 423 (where the NTS signal exhibits maximum skewness) by a TFC DAC amount of 350 that corresponds to about 35 mW of TFC power. Thermal energy (TFC power) applied to the head causes thermal expansion of the head in an amount that is proportional to the TFC power applied. The response of the head to TFC power is determined and calibrated during manufacturing such that there is a known relationship between a given TFC power and a corresponding change in head-disk spacing. In FIG. 6C, for example, 35 mW of TFC power corresponds to a change in head-disk spacing of approximately 3.5 nm, which is the distance that the head thermally expands towards the disk due to the application of TFC power. This distance is indicative of the smear height, since it is the distance that the head moves from the point where skewness begins (indicating the start of smear interaction) to the point where skewness reaches its maximum (maximum thermal interference from the smear). In sum, the TFC power required to displace the head from where skewness begins to maximum skewness in the NTS signal directly correlates with the height of accumulated smear on the recording head.

Smear presence may be confirmed by analyzing additional head-disk interface and/or servo metrics. In some examples, such additional metrics may be used to again confirm smear presence after smear presence and height has been measured by skewness in the thermal proximity sensor signal(s), and in other examples, additional head-disk interface and/or servo metrics may confirm smear presence independently of skewness measurements.

Figure 7A:
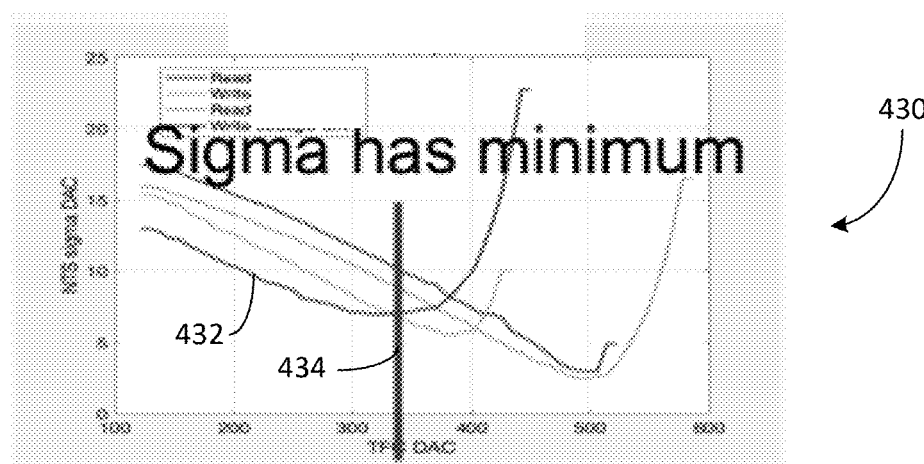
FIG. 7A is a graph plotting the sigma of the NTS signal versus TFC heater power, in accordance with aspects of this disclosure.

One example of an additional metric used to confirm smear presence is the sigma (standard deviation) of the thermal proximity sensor signal. FIG. 7A is a graph 430 plotting the sigma of the underlying NTS signals of FIG. 6C versus TFC power (in this case, TFC2) in DAC units. Sigma represents the variability or spread of the NTS signal, and thus graph 430 shows how much the NTS signal fluctuates around its mean as the head approaches the disk surface due to increasing TFC power. As can be seen in FIG. 7A, the sigma curve 432 of the NTS signal during write mode for a head coated with a first material has a minimum 434 at about 350 DAC, which corresponds to the TFC power at which the same NTS signal exhibits maximum skewness (i.e., point 423 of NTS skewness curve 422 of FIG. 6C). Thus, the NTS signal is in its most stable and consistent state at the same TFC power level where it exhibits maximum skewness, indicating that the head is in steady contact with the smear accumulation at this point. As TFC power is increased beyond 350 DAC, the sigma rises, indicating more variability in the head's interaction with the disk surface as it moves towards frictional touchdown. Knowing the TFC power level at which sigma is at its minimum indicates where the head is encountering the bulk of the smear accumulation and the distance the head has moved towards the disk surface to get to that sigma minimum, which directly correlates with the height of accumulated smear on the recording head. Thus, the sigma minimum of the NTS signal provides another indicator of smear presence and height.

Figure 7B:
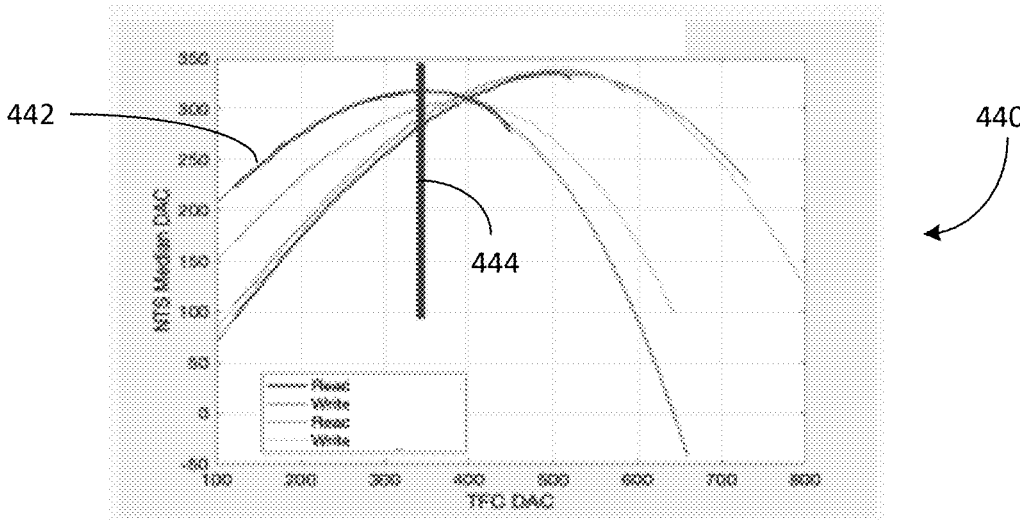
FIG. 7B is a graph plotting the median of the NTS signal versus TFC heater power, in accordance with aspects of this disclosure.

Another example of a metric that may be used to confirm smear presence is the median and RMS of the thermal proximity sensor signal. FIG. 7B is a graph 440 plotting the median of the underlying NTS signals of FIG. 6C versus TFC power (in this case, TFC2) in DAC units. As can be seen in FIG. 7B, the median curve 442 of the NTS signal during write mode for a head coated with a first material has a maximum 444 at about 350 DAC, which corresponds to the TFC power at which the same NTS signal exhibits maximum skewness (i.e., point 423 of NTS skewness curve 422 of FIG. 6C) and minimum sigma (i.e., point 434 of sigma curve 432 of FIG. 7A). Thus, the NTS signal is at its highest median temperature at the same TFC power level where it exhibits maximum skewness and minimum sigma, and provides another important indicator of smear height. In this regard, the RMS of the NTS signal is also at its maximum at the same point, i.e., about 350 DAC.

Figure 8A:
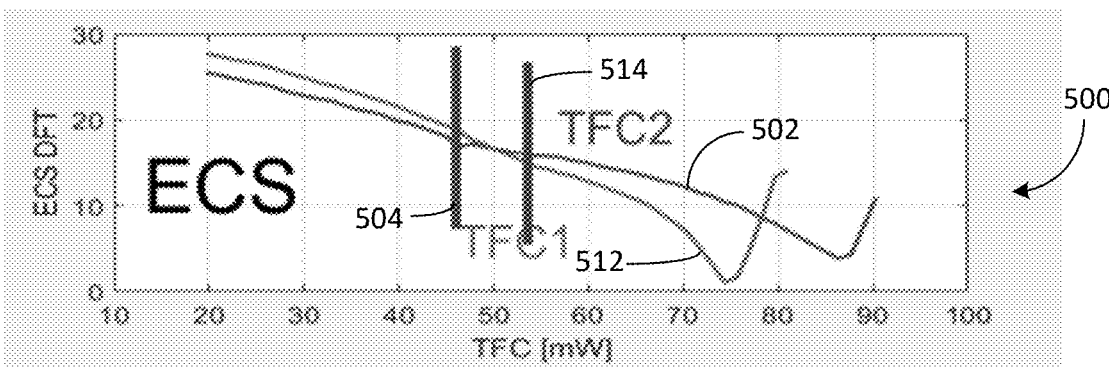
FIG. 8A is a graph plotting the discrete Fourier transform (DFT) of the ECS signal versus TFC heater power, in accordance with aspects of this disclosure.

Another example of a metric that may be used to confirm smear presence is the touchdown (TD) behavior of the discrete Fourier transforms (DFT) of the thermal proximity sensor signals. FIG. 8A is a graph 500 showing the ECS DFT versus TFC power at TD for both the TFC1 and TFC2 heaters. In particular, curve 502 shows the ECS DFT with TFC2 (writer) heater power applied, and curve 512 shows the ECS DFT with TFC1 (reader) heater power applied. As can be seen, ECS DFT curve 502 exhibits a "bending" at 504 with about 46 mW of TFC2 heater power applied, which is indicative of the cooling signature of the smear (i.e., head interaction with the smear). After encountering the smear at 504, TFC2 continues pushing the head towards disk surface with eventual frictional TD at about 86 mW. A less pronounced bending can also be seen at 514 in ECS DFT curve 512 with about 54 mW of TFC1 heater power applied, which is also indicative of the cooling signature of the smear. After encountering the smear at 514, TFC1 continues pushing the head towards the disk surface with eventual frictional TD at about 75 mW.

Figure 8B:
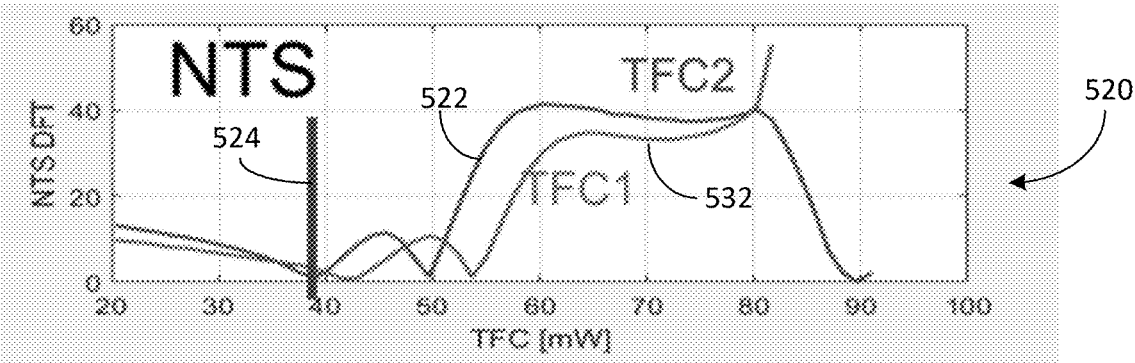
FIG. 8B is a graph plotting the DFT of the NTS signal versus TFC heater power, in accordance with aspects of this disclosure.

FIG. 8B is a graph 520 showing the NTS DFT versus TFC power at TD for both the TFC1 and TFC2 heaters. In particular, curve 522 shows the NTS DFT with TFC2 (writer) heater power applied, and curve 532 shows the NTS DFT with TFC1 (reader) heater power applied. Notably, both curves 522 and 532 show early indications of smear interaction. NTS DFT curve 522 abruptly rises from a minima at 524 with just less than 40 mW of TFC2 heater power, indicating the cooling signature of the smear substantially before frictional TD at around 90 mW. NTS DFT curve 524 also provides an early indication of smear interaction, rising from a minima with just more than 40 mW of TFC1 heater power. A comparison of FIGS. 8A and 8B suggests that the extent of smear buildup is more pronounced on the writer side than on the reader side, which aligns with expectations since the HAMR laser that heats disk surface 17 and that is a substantial contributor to the smear buildup is on the writer side.

Figure 8C:
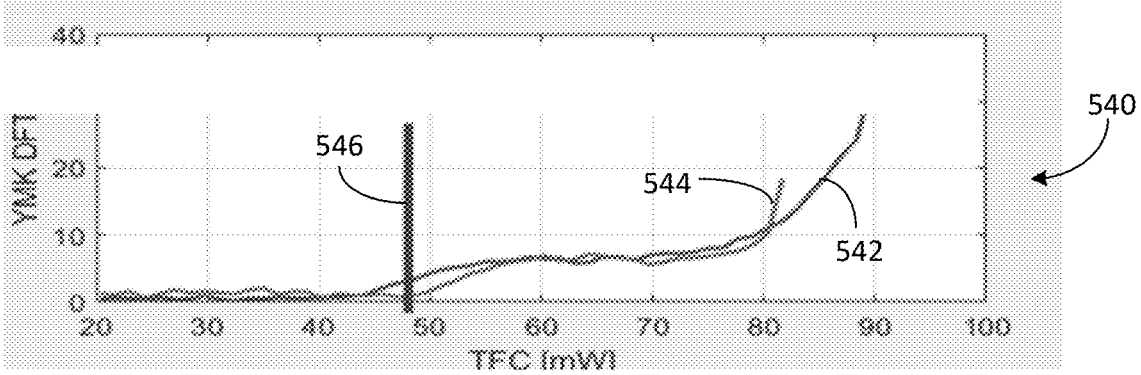
FIG. 8C is a graph plotting the DFT of a YMK signal versus TFC heater power, in accordance with aspects of this disclosure.

The DFT of other head-disk interface and servo signals may also serve as metrics for confirming smear presence. The YMK signal, for example, is an indicator of off-track vibration. FIG. 8C shows the DFT of the YMK signal plotted against TFC2 power (curve 542) and TFC1 power (curve 544). The upward rise of both curves at 546 (just less than 50 mW of TFC power) occurs substantially before frictional TD (80-90 mW) and is due to off-track vibrations caused by the presence of smear. Other head-disk interface and servo signals that may serve as metrics for confirming smear presence include, without limitation, the position error signal (PES), which also exhibits off-track vibrations due to smear; the SID (servo identification) to SID or S2S timing signal, which exhibits down-track vibrations due to smear; and the head media spacing (HMS) signal that measures Wallace spacing.

Figure 9A:
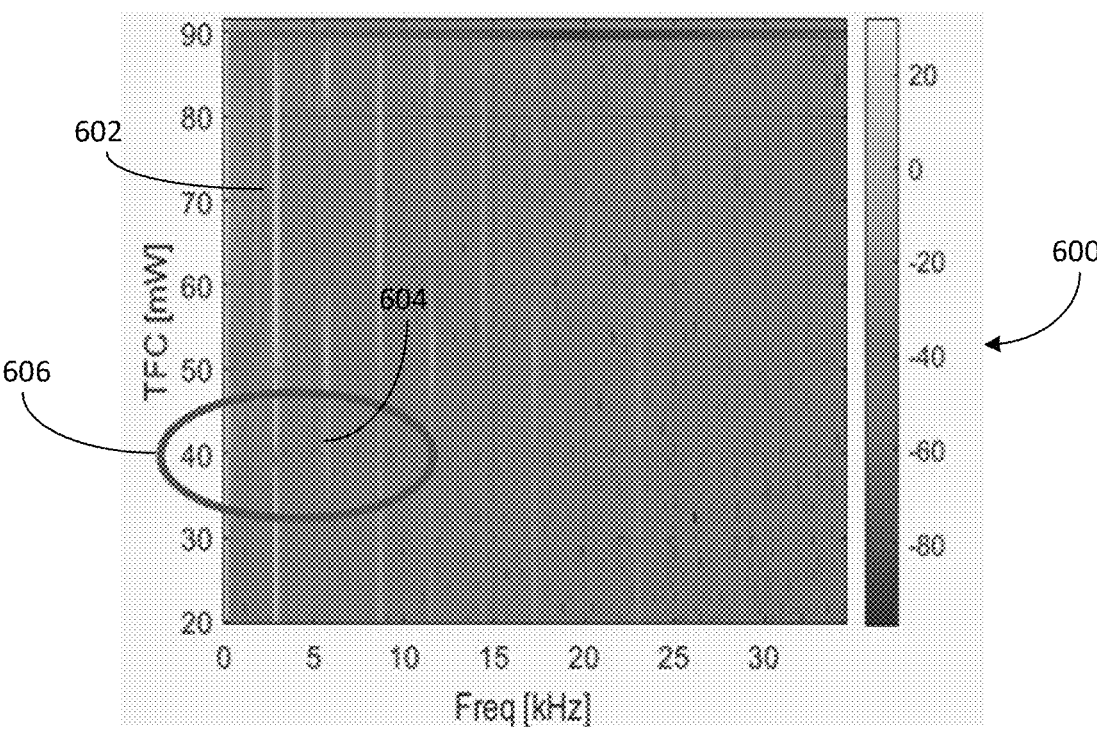
FIG. 9A is a graph plotting the DFT of the NTS signal against TFC power and frequency in write mode, in accordance with aspects of this disclosure.

Another example of a metric that may be used to confirm smear presence is the presence of higher harmonics, particularly in the NTS signal, showing that the head is experiencing nonlinear thermal effects due to smear contamination. FIG. 9A is a graph 600 plotting the DFT of the NTS signal against TFC power (in this example TFC2, the write heater) and frequency in write mode. In normal operation, without the presence of smear, the first harmonic (fundamental frequency) 602 at 3 kHz dominates. However, in graph 600, the appearance of a second harmonic 604 at 6 kHz in the circled region 606 indicates that the head is experiencing nonlinear thermal effects, likely due to smear contamination. It can also be seen in region 606 that as second harmonic 604 appears, first harmonic 602 trends towards zero. Thus, there is essentially an energy transfer from the fundamental frequency to the second harmonic. In the NTS signal with smear present, even harmonics (second, fourth, sixth) appear in write mode.

Figure 9B:
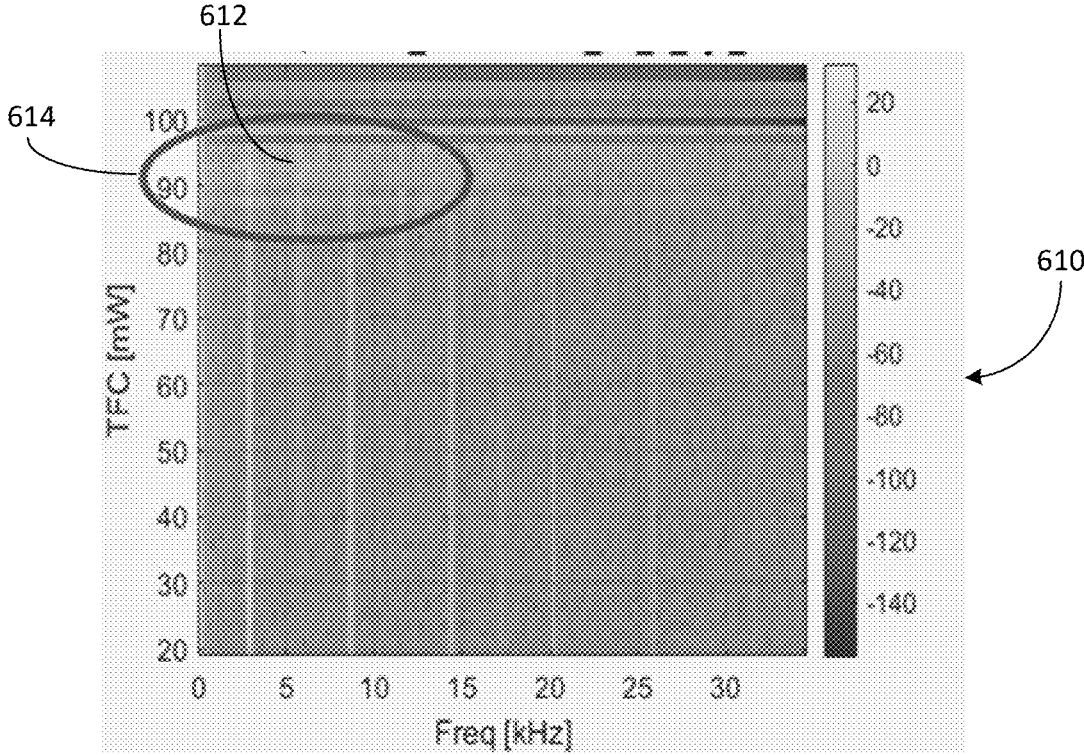
FIG. 9B is a graph plotting the DFT of the ECS signal against TFC power and frequency in read mode, in accordance with aspects of this disclosure.

Higher harmonics are not as effective for confirming smear presence in read mode. FIG. 9B is a graph 610 plotting the DFT of the ECS signal against TFC power (in this example TFC1, the read heater) in read mode. As can be seen in circled region 614, a second harmonic 612 appears only just before frictional TD at around 90 mW. Thus, in read mode, the head experiences fewer nonlinearities from smear as compared to write mode.

Figure 9C:
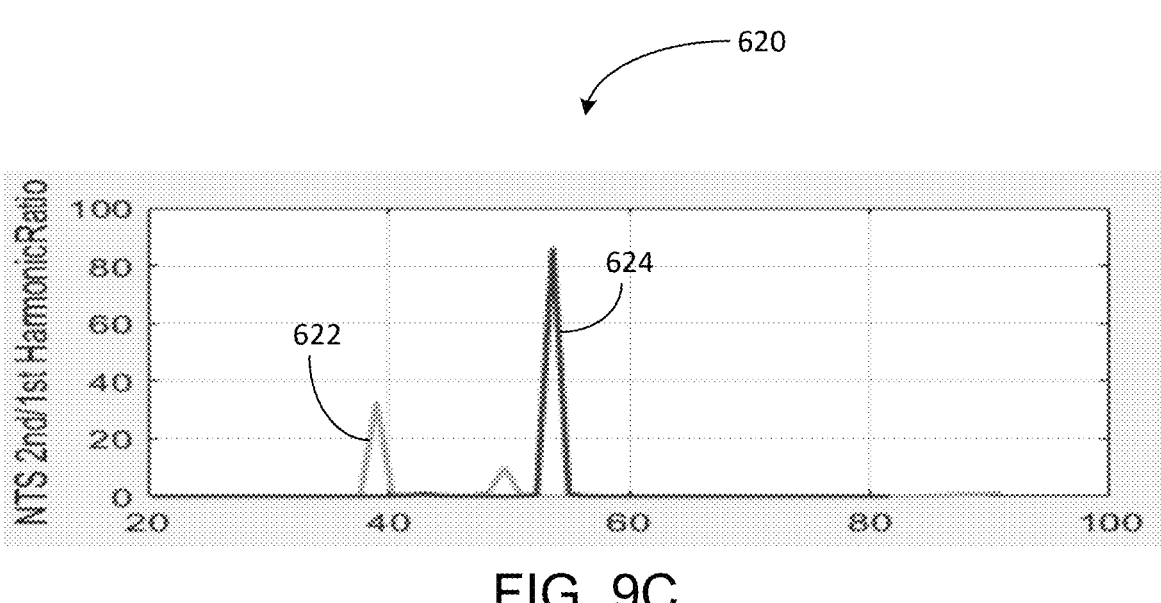
FIG. 9C is a graph plotting the second harmonic/first harmonic ratio of the NTS signal versus TFC power during write TD, in accordance with aspects of this disclosure.
Figure 9D:
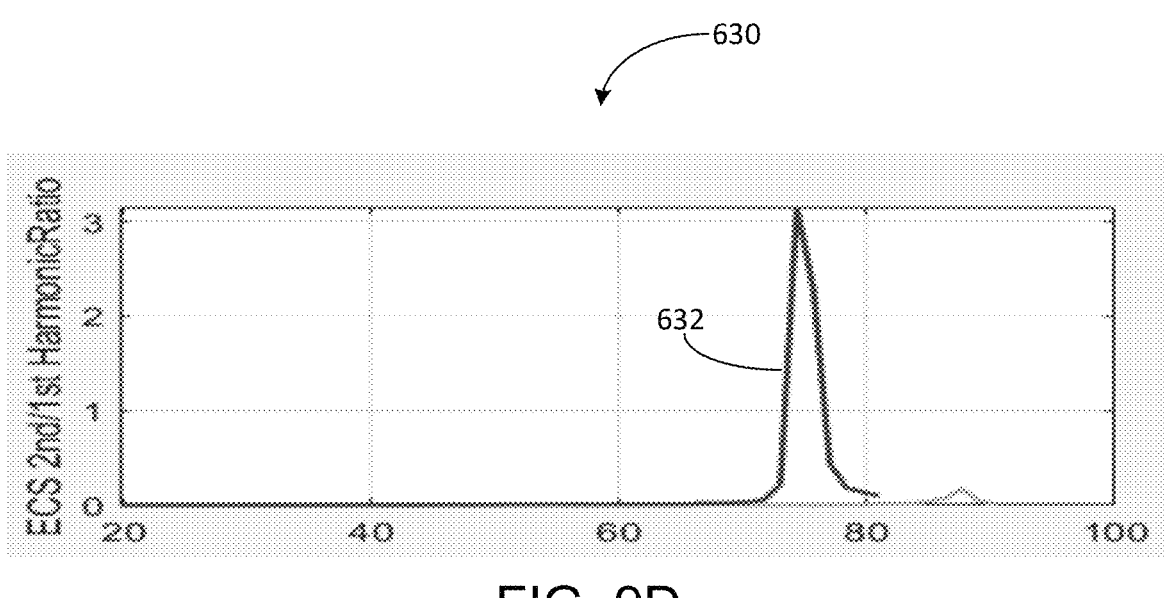
FIG. 9D is a graph plotting the second harmonic/first harmonic ratio of the ECS signal versus TFC power during write TD, in accordance with aspects of this disclosure.

FIGS. 9C-9D show an alternative way of evaluating the second harmonic—the ratio of the second harmonic to the first harmonic. FIG. 9C is a graph 620 plotting the second harmonic/first harmonic (DFT2/DFT1) ratio of the NTS signal versus TFC power during write TD. As expected from FIG. 9C, with TFC2 (writer heater) power applied, the DFT2/DFT1 ratio of the NTS signal spikes at 622 (just short of 40 mW) and provides an early indication of smear presence. This correlates with the appearance of a second harmonic 604 at 6 kHz in the circled region 606 of FIG. 9A (and disappearance of the first harmonic 602) indicating that the head is experiencing nonlinear thermal effects due to smear contamination. When TFC1 (reader heater) power is instead applied during write TD, smear presence is not detected until later with a spike at 624 around 55 mV. FIG. 9D is a graph 630 plotting the second harmonic/first harmonic (DFT2/DFT1) ratio of the ECS signal versus TFC power during write TD. Here, in correlation with FIG. 9B, a spike 632 in the DFT2/DFT1 ratio is not seen until 75-80 mW of TFC power has been applied, which aligns with earlier observations that the extent of smear buildup is more pronounced on the writer side than the reader side.

Removal of smear, once detected and measured as described above, is essential for maintaining the reliability, performance, and longevity of a disk drive. Smear removal helps to ensure consistent fly heights and data integrity, and reduces off-track or down-track vibrations caused by the smear. One method of smear removal is TD overpush, which involves applying additional TFC power beyond the typical touchdown (TD) point, causing the head to make more intense contact with the disk surface. This increases the friction between the head and the disk, which helps to dislodge and remove smear buildup. TD overpush is care-
fully managed to avoid excessive wear or damage to the
disk.

Figure 10A:
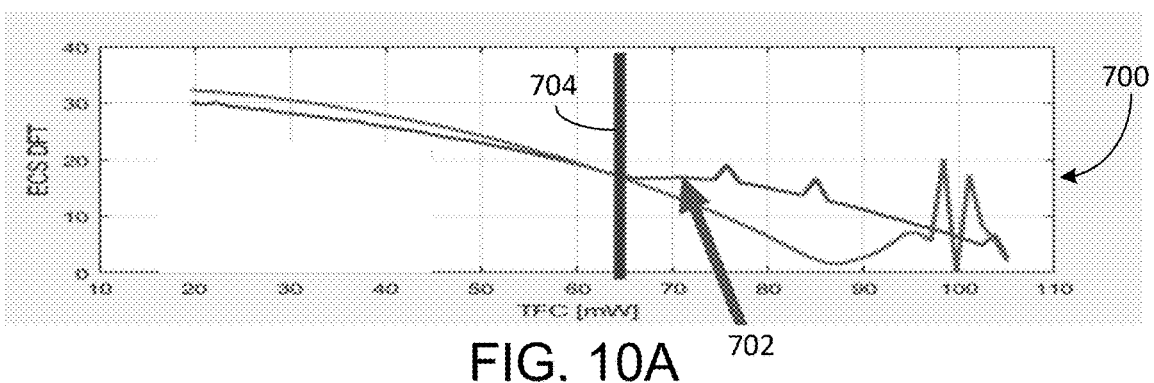
FIG. 10A is a graph plotting the DFT of the ECS signal versus TFC power after a first TD overpush, in accordance with aspects of this disclosure.
Figure 10B:
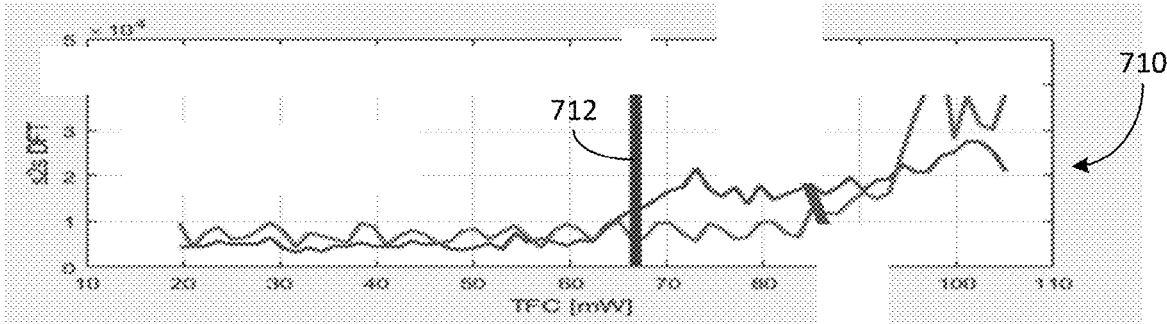
FIG. 10B is a graph plotting the DFT of an S2S signal versus TFC power after the first TD overpush, in accordance with aspects of this disclosure.
Figure 10C:
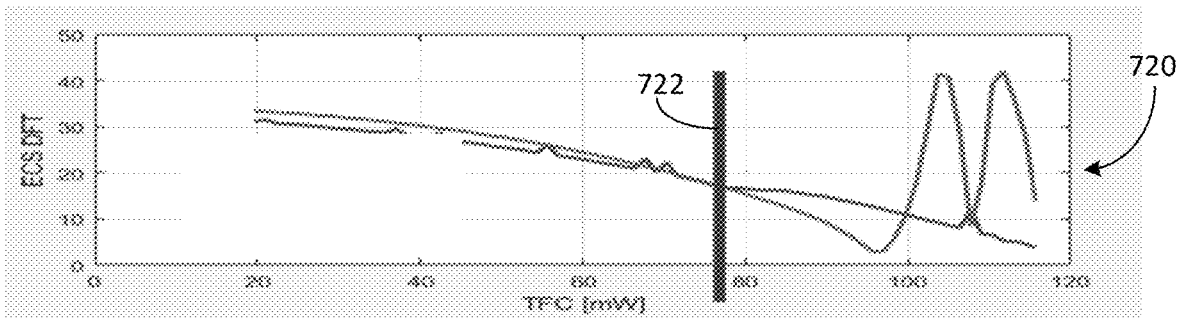
FIG. 10C is a graph plotting the DFT of the ECS signal versus TFC power after a second TD overpush, in accordance with aspects of this disclosure.
Figure 10D:
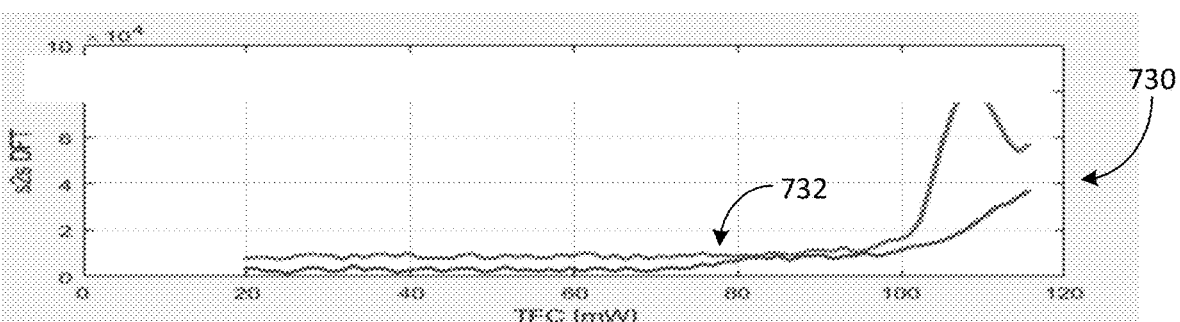
FIG. 10D is a graph plotting the DFT of the S2S signal versus TFC power after the second TD overpush, in accordance with aspects of this disclosure.

FIGS. 10A-10D illustrate smear removal by TD overpush
with reference to DFTs of the ECS and S2S signals. First,
consider a state of smear as shown in FIG. 8A, with the
bending of the ECS DFT curve 502 with TFC2 power
applied indicating that the head begins to encounter smear at
about 46 mW (line 504). A TD overpush is then performed,
with the resulting ECS DFT signal (after TD overpush)
shown in graph 700 of FIG. 10A. The bending of the ECS
DFT curve 702 now does not start until about 65 mW of TFC
power has been applied, meaning that smear is not encoun-
tered until the head is about 2 nm closer to the disk (20 mW
of TFC power corresponds to about 2 nm of head spacing)
as compared to FIG. 8A. Thus, one TD overpush removes a
substantial portion of the smear from the reader side of the
head, where the ECS is located. This result is confirmed by
the post-TD overpush S2S signal in graph 710 of FIG. 10B,
which shows that downtrack vibrations due to smear are not
detected until about 65 mW of TFC power (line 712). FIGS.
10C-10D show the resulting ECS and S2S signals after a
second TD overpush is performed. Graph 720 of FIG. 10C
shows that after a second TD overpush, the bending of the
ECS DFT curve now does not start until almost 80 mW of
TFC power has been applied, indicating that about 3.5 nm of
smear has been removed as compared to the state of smear
in FIG. 8A before the two TD overpushes. This result is
confirmed by the post-2TD overpush S2S signal in graph
730 of FIG. 10D, which shows that downtrack vibrations
due to smear are also not detected until after about 80 mW
of TFC power has been applied (at around 732). Additional
TD overpushes can be performed if needed. Thus, it can be
seen from FIGS. 10A-10D that TD overpush is an effective
method of removing smear from the reader side of the head.

Figure 11A:
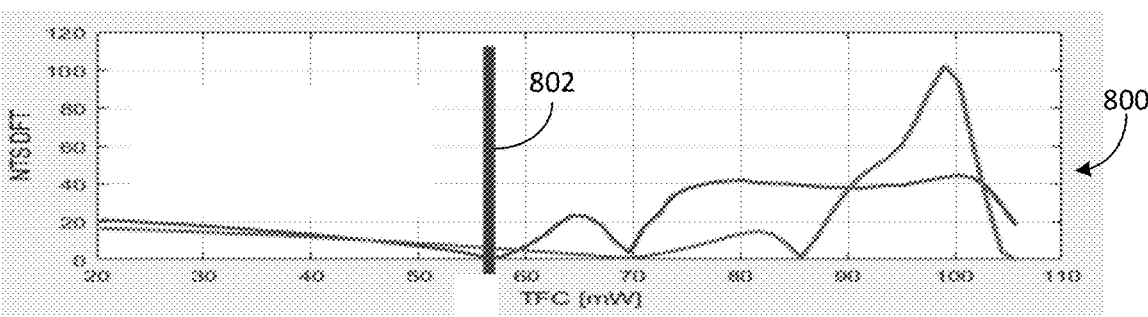
FIG. 11A is a graph plotting the DFT of the NTS signal versus TFC power after a first TD overpush, in accordance with aspects of this disclosure.
Figure 11B:
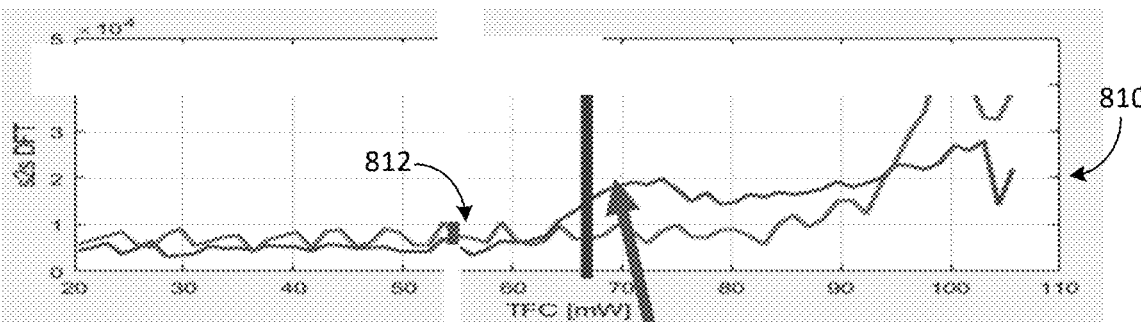
FIG. 11B is a graph plotting the DFT of the S2S signal versus TFC power after the first TD overpush, in accordance with aspects of this disclosure.
Figure 11C:
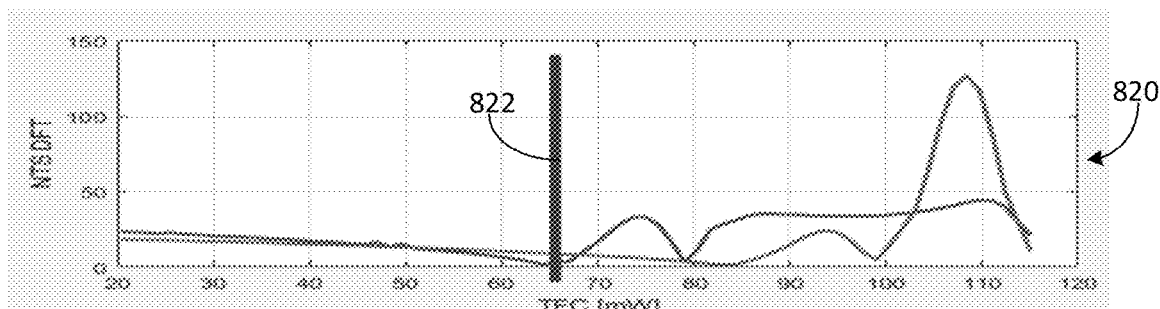
FIG. 11C is a graph plotting the DFT of the NTS signal versus TFC power after a second TD overpush, in accordance with aspects of this disclosure.
Figure 11D:
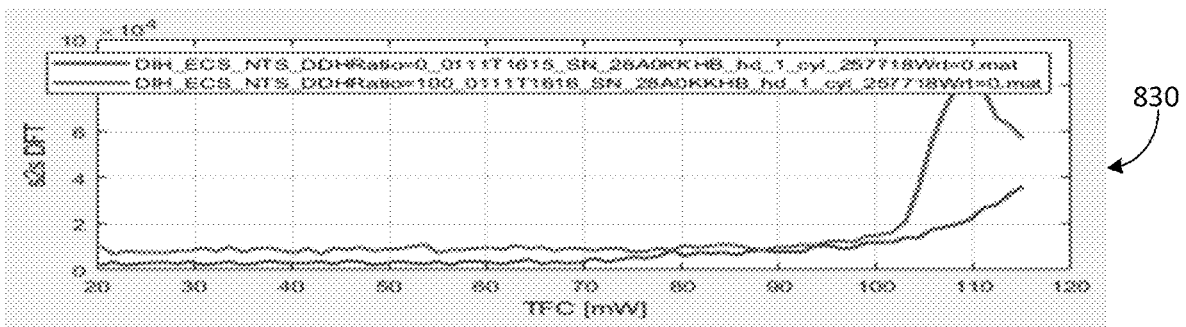
FIG. 11D is a graph plotting the DFT of the S2S signal versus TFC power after the second TD overpush, in accordance with aspects of this disclosure.

FIGS. 11A-11D show smear removal by TD overpush
with reference to DFTs of the NTS and S2S signals. First,
consider a state of smear as shown in FIG. 8B, with the
minima of the NTS DFT curve 522 with TFC2 power
applied indicating that the head begins to encounter smear at
about 40 mW (line 524). A TD overpush is then performed,
with the resulting NTS DFT signal (after TD overpush)
shown in graph 800 of FIG. 11A. The minima of the NTS
DFT curve now does not start until about 55 mW of TFC
power has been applied, meaning that smear is not encoun-
tered until the head is about 1.5 nm closer to the disk (15
mW of TFC power corresponds to about 1.5 nm of head
spacing) as compared to FIG. 8B. Thus, one TD overpush
removes a substantial portion of the smear from the writer
side of the head, where the NTS is located, but not quite as
much as was removed by one TD overpush from the reader
side of the head. This aligns with expectations, since smear
accumulation is more pronounced on the writer side. This
result is confirmed by the post-TD overpush S2S signal in
graph 810 of FIG. 11B, which shows that downtrack vibra-
tions due to smear are not detected until about 55 mW of
TFC power (line 812). FIGS. 11C-11D show the resulting
NTS and S2S signals after a second TD overpush is per-
formed. Graph 820 of FIG. 11C shows that after a second TD
overpush, the bending of the NTS DFT curve now does not
start until about 65 mW of TFC power has been applied,
indicating that about 2.5 nm of smear has been removed as
compared to the state of smear in FIG. 8B before the two TD
overpushes. This result is confirmed by the post-2TD over-
push S2S signal in graph 830 of FIG. 11D, which shows that
downtrack vibrations due to smear are significantly dimin-
ished. Additional TD overpushes can be performed if needed. Thus, it can be seen from FIGS. 11A-11D that TD
overpush is also an effective method of removing smear
from the writer side of the head.

Figure 12:
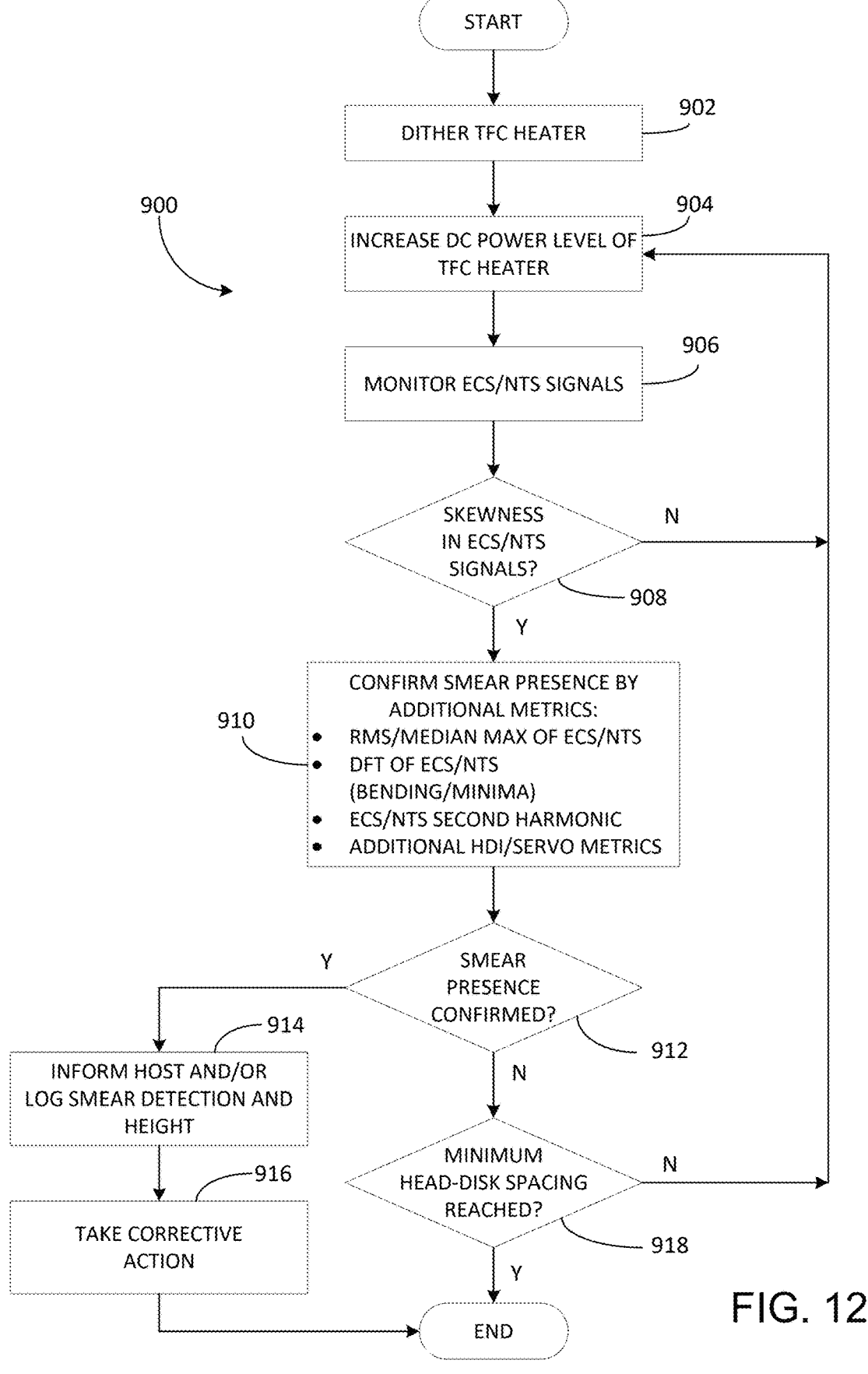
FIG. 12 is a flow diagram of a method for detecting and confirming smear presence on a recording head, in accordance with aspects of this disclosure.

FIG. 12 is a flow diagram of a method 900 for detecting
smear presence by skewness in the ECS/NTS signal and
then confirming the smear presence by at least one addi-
tional metric. Method 900 may be performed in-situ peri-
odically (such as after each write operation) or at times when
there is sufficient idle time to perform TFC1 and/or TFC2
dithering (such as plus or minus 3A, for example) at the
nominal fly height (such as about 8 nm, for example). The
ECS and NTS signals may be measured as described herein
over 1-3 disk revolutions, for example. Method 900 may
also be performed in the field at predetermined time inter-
vals. For example, method 900 may be performed during the
full TFC1 and TFC2 sweeps in LRC TDBO mode operation,
which is typically every 8-24 hours.

In step 902 of method 900, the TFC heater (TFC1 or
TFC2) is dithered or oscillated. The TFC heater power is
increased to a particular DC power level about which the
TFC heater is dithered (step 904). In one example, as
illustrated in FIG. 6B, writer heater 180 (TFC2) may be
dithered about multiple DC power levels, and will initially
be set at a lower DC power level and then progressively
increased. In step 906, the thermal proximity sensor signals
(ECS and NTS) are monitored as the TFC heater is being
dithered. In step 908, the ECS and/or NTS signals are
analyzed for any skewness. One example of analyzing and
measuring skewness in the NTS signal is shown in FIG. 6C,
including determining smear height from the TFC heater
power required to displace the recording head from a point
where the skewness begins in the NTS signal to a point
where the skewness is at a maximum in the NTS signal. If
no skewness or an amount of skewness that is not within a
predetermined range is detected in the ECS/NTS signal
(908-N), the method loops back to step 904 and increases the
DC power level about which the TFC heater is dithered to
move the recording head closer to the disk surface. Steps
906 and 908 are then repeated to determine whether there is
skewness in the ECS/NTS signals at the increased power
level.

If the skewness falls within a predetermined range that is
indicative of smear presence (908-Y), then step 910 seeks
confirmation of the smear presence by analyzing one or
more additional metrics in the ECS/NTS signals or in other
head-disk interface or servo signals. One example of a
confirming metric is determining whether a median or an
RMS of the thermal proximity sensor signal has a maximum
at the TFC heater power where the skewness is at the
maximum (see FIG. 7B, for example). Another example of
a confirming metric is detecting bending in the DFT of the
ECS signal as the DC power level of the TFC heater is
increased to move the recording head towards touchdown
(see FIG. 8A, for example). Another example of a confirm-
ing metric is detecting a minima in the DFT of the NTS
signal as the DC power level of the TFC heater is increased
to move the recording head towards touchdown (see FIG.
8B, for example). Another example of a confirming metric
is detecting off-track or down-track vibration before touch-
down of the recording head (see FIG. 8C, for example).
Another example of a confirming metric is detecting a
second harmonic in the NTS signal (see FIGS. 9A and 9C,
for example).

If smear presence is confirmed by at least one of these
additional metrics (912-Y), then a smear is declared, the host
is informed of the confirmed smear detection and/or the
smear detection and height are logged in the data storage device (step 914). In some examples, corrective action is taken to remove the accumulated smear (step 916). One example of a corrective action is performing one or more TD overpushes to remove the smear (see FIGS. 10A-10D and FIGS. 11A-11D, for example). Other examples of corrective actions include performing an on-track burnish (OTB), changing the fly height (dFH), changing the HAMR laser current, and depopulating the recording head. If smear presence could not be confirmed by any of the additional metrics (912-N), and a preset minimum head-disk spacing (such as 0.2 nm, for example) has not yet been reached (918-N), then no smear is declared and the method returns to step 904 to increase the DC power level about which the TFC heater is dithered to move the recording head progressively closer to the disk surface.

Figure 13:
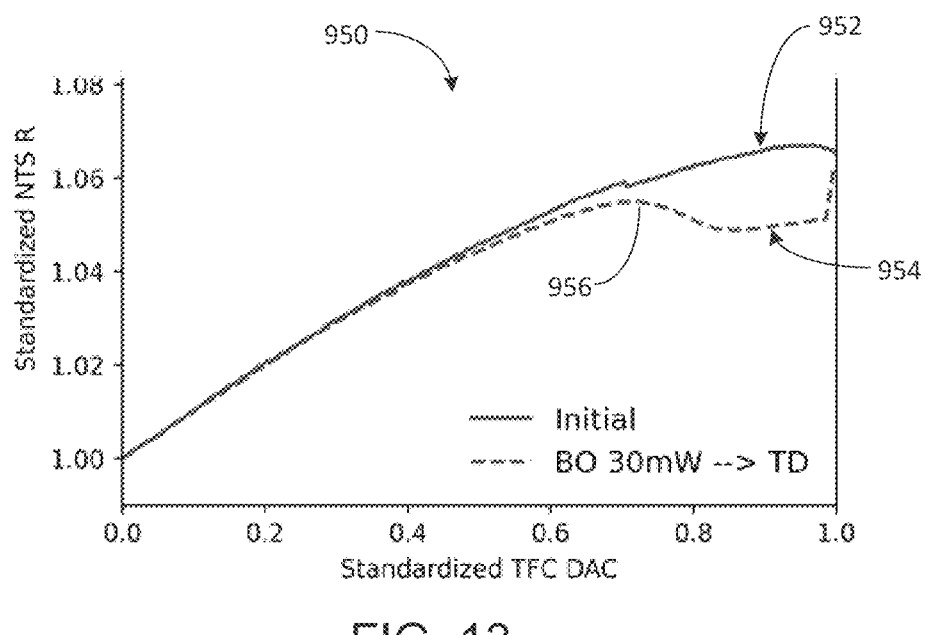
FIG. 13 is a graph plotting standardized NTS resistance versus standardized TFC power, in accordance with aspects of this disclosure.

FIG. 13 is a graph 950 that illustrates an additional metric that may be used to detect and measure smear on a recording head. Graph 950 plots the standardized resistance of a thermal proximity sensor (in this case, NTS 142) versus the standardized TFC power (in this case, TFC2 or write heater 180) at a back-off power of 30 mW. Graph 950 includes solid curve 952, which represents the initial NTS behavior as TFC power is increased towards TD (i.e., before smear accumulation), and dashed curve 954 represents the NTS behavior after aging (i.e., after smear has accumulated during operation). In the example of FIG. 13, dashed curve 954 depicts NTS resistance after 10 minutes of HDD operation at a back-off power of 40 mW and 150% laser power.

As TFC power is gradually increased, the NTS resistance and temperature also increase, reducing the head-disk spacing. Initially, curves 952 and 954 show similar behavior. However, as TFC power continues to increase, dashed curve 954 diverges or bends from solid curve 952, exhibiting a distinct bend at 956 around the 0.7 standardized TFC value. Bend 956 is a cooling signature resulting from the accumulation of smear on the head during aging. Thus, the bending of aged curve 954 at bend 956 indicates the presence of smear, and the TFC power required to achieve TD after the detection of smear at bend 956 serves as a measure of the height of the smear accumulated on the recording head.

Figure 14:
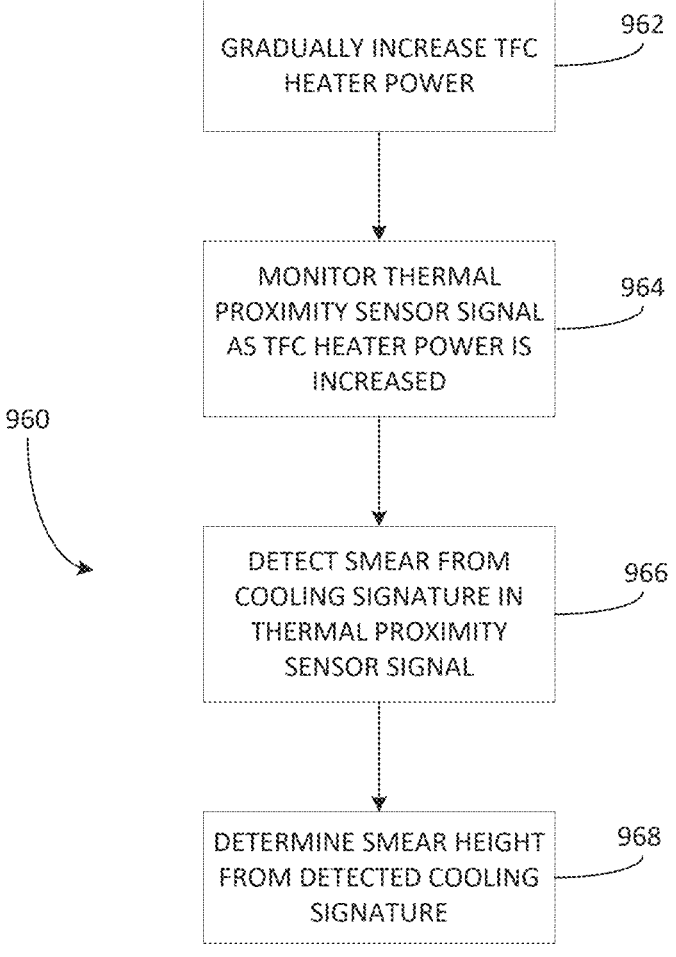
FIG. 14 is a flow diagram of another method for detecting and confirming smear presence on a recording head, in accordance with aspects of this disclosure.

FIG. 14 illustrates a method 960, implemented by control circuitry 22, for detecting and measuring smear derived from the behavior shown in graph 950 of FIG. 13. In step 962, TFC heater power is gradually increased, moving the recording head closer to the disk surface. In one example, the power of TFC2 (write heater 180) is gradually increased in step 962. In step 964, a thermal proximity sensor signal is monitored as TFC power is increased. In one example, the resistance of NTS 142 is monitored as the power of TFC2 (write heater 180) is increased. In step 966, smear detection is indicated by a cooling signature in the thermal proximity sensor signal. In one example, as shown in graph 950 of FIG. 13, a distinct bend in the thermal proximity sensor signal (i.e., bend 956 in curve 954) is an indicator of smear accumulation. In step 958, the height of the accumulated smear on the recording head is determined from the detected cooling signature. In one example, the TFC power required to achieve TD after the detection of smear at bend 956 serves as a measure of the height of the smear accumulated on the recording head.

The methods and flow diagrams disclosed herein are implemented by control circuitry 22, which may be implemented partially or wholly in one or more processing devices such as a PLSI, an integrated circuit (IC) such as a system-on-a-chip (SOC), arm electronics, and/or any other suitable circuitry or controller. Control circuitry 22 may further comprise a microprocessor executing instructions operable to perform the methods and flow diagrams described herein, individually or in combination with one another. The instructions may be stored in a computer-readable medium, such as a non-volatile semiconductor memory device that may be external to the microprocessor or integrated with the microprocessor in an SOC. The instructions may alternatively be stored on a disk and read into a volatile semiconductor memory when the HDD is powered on. Control circuitry 22 may comprise logic circuitry such as state machine circuitry or other suitable logic circuitry. The methods and flow diagrams disclosed herein may be implemented using analog circuitry, digital circuitry, or a combination thereof.

One or more processing devices may comprise control circuitry 22 and may perform, individually and/or collectively, some or all of the functions of control circuitry 22. Such processing devices may be part of the HDD and/or abstracted away from physically proximity to the HDD. Such processing devices may be part of or proximate to one or more unitary products, racks comprising multiple data storage devices, physical or virtual servers, local area networks, storage area networks, data centers, and/or cloud services. Disk drives or HDDs as disclosed herein may include magnetic, optical, hybrid, or other types of disk drives. Devices such as computing devices, data servers, media content storage devices, and other devices may comprise the storage media and control circuitry described herein.

While certain embodiments are described herein, these embodiments are presented by way of example only, and do not limit the scope of this disclosure. Various omissions, substitutions and changes may be made without departing from the spirit and scope of this disclosure. The methods and processes described herein are not limited to any particular sequence and may be used independently or combined in various ways. Some method or process steps may be omitted and other steps added in some implementations. Nothing in this description implies that any particular feature, component, characteristic, or step is necessary or indispensable. Many variations, modifications, additions, and improvements are possible and fall within the scope of this disclosure as defined by the following claims.

The invention claimed is:

1. A data storage device comprising:
   a disk;
   a recording head;
   a thermal fly-height control (TFC) heater configured to thermally adjust a spacing of the recording head from a surface of the disk;
   a thermal proximity sensor configured to detect a spacing of the recording head from the disk surface and to generate a thermal proximity sensor signal indicative of the detected spacing; and
   one or more processing devices, individually or in combination, configured to:
      dither the TFC heater about a direct current (DC) power level;
      measure a skewness in the thermal proximity sensor signal while the TFC heater is being dithered; and
      determine, from the measured skewness, a height of smear accumulated on the recording head.

2. The data storage device of claim 1, wherein the one or more processing devices is further configured, individually or in combination, to determine the height of the smear by measuring an amount of TFC heater power required to displace the recording head from a point where the skewness begins in the thermal proximity sensor signal to a point where the skewness is at a maximum in the thermal proximity sensor signal.

3. The data storage device of claim 1, wherein the thermal proximity sensor comprises a near-field temperature sensor (NTS) configured in a write portion of the recording head.

4. The data storage device of claim 1, wherein the TFC heater is configured in a write portion of the recording head.

5. The data storage device of claim 2, wherein the one or more processing devices is further configured, individually or in combination, to confirm a presence of the smear by determining that a median or a root mean square (RMS) of the thermal proximity sensor signal has a maximum at the TFC heater power where the skewness is at the maximum.

6. The data storage device of claim 3, wherein:
the thermal proximity sensor further comprises an embedded contact sensor (ECS) configured in a reader portion of the recording head; and
the one or more processing devices is further configured, individually or in combination, to confirm a presence of the smear by detecting bending in a discrete Fourier transform (DFT) of a signal generated by the ECS as the TFC heater power is increased to move the recording head towards touchdown.

7. The data storage device of claim 3, wherein the one or more processing devices is further configured, individually or in combination, to confirm a presence of the smear by detecting a minimum in a discrete Fourier transform (DFT) of a signal generated by the NTS as TFC heater power is increased to move the recording head towards touchdown.

8. The data storage device of claim 3, wherein the one or more processing devices is further configured, individually or in combination, to confirm a presence of the smear by detecting off-track or down-track vibration before touchdown of the recording head.

9. The data storage device of claim 3, wherein the one or more processing devices is further configured, individually or in combination, to confirm a presence of the smear by detecting a second harmonic in a signal of the NTS.

10. The data storage device of claim 1, wherein the one or more processing devices is further configured, individually or in combination, to remove the smear from the recording head by performing at least one touchdown overpush.

11. A method for detecting smear height on a recording head of a data storage device, the method comprising:
dithering a thermal fly-height control (TFC) heater that is configured to thermally adjust a spacing of the recording head from a surface of a disk of the data storage device about a direct current (DC) power level;
measuring a skewness in a thermal proximity sensor signal indicative of the spacing of the recording head from the disk surface while the TFC heater is being dithered; and
determining, from the measured skewness, a height of smear accumulated on the recording head.

12. The method of claim 11, wherein the height of the smear is determined by measuring an amount of TFC heater power required to displace the recording head from a point where the skewness begins in the thermal proximity sensor signal to a point where the skewness is at a maximum in the thermal proximity sensor signal.

13. The method of claim 11, further comprising confirming a presence of the smear by detecting bending in a discrete Fourier transform (DFT) of the thermal proximity sensor signal as the TFC heater power is increased to move the recording head towards touchdown.

14. The method of claim 11, further comprising confirming a presence of the smear by detecting a minimum in a discrete Fourier transform (DFT) of the thermal proximity sensor signal as the TFC heater power is increased to move the recording head towards touchdown.

15. The method of claim 11, further comprising confirming a presence of the smear by detecting a second harmonic in the thermal proximity sensor signal.

16. The method of claim 11, further comprising performing at least one touchdown overpush to remove the smear from the recording head.

17. A data storage device comprising:
a disk;
a recording head;
a thermal fly-height control (TFC) heater configured to thermally adjust a spacing of the recording head from a surface of the disk;
a thermal proximity sensor configured to detect a spacing of the recording head from the disk surface and to generate a thermal proximity sensor signal indicative of the detected spacing; and
one or more processing device means, individually or in combination, configured to:
gradually increase a power of the TFC heater;
monitor the thermal proximity sensor signal as the TFC heater power is increased; and
detect a cooling signature in the thermal proximity sensor signal that is indicative of accumulation of smear on the recording head.

18. The data storage device of claim 17, wherein the one or more processing device means is further configured, individually or in combination, to determine a height of the accumulation of smear on the recording head.

19. The data storage device of claim 17, wherein:
the TFC heater is configured in a write portion of the recording head;
the thermal proximity sensor is a near-field temperature sensor (NTS) configured in the write portion of the recording head; and
the one or more processing device means is further configured, individually or in combination, to measure a resistance of the NTS as the TFC heater power is increased.

20. The data storage device of claim 19, wherein the one or more processing device means is further configured, individually or in combination, to detect the cooling signature by detecting bending in the thermal proximity sensor signal.

* * * * *